US008610933B2

(12) United States Patent
Tani et al.

(10) Patent No.: US 8,610,933 B2
(45) Date of Patent: Dec. 17, 2013

(54) OPERATION CONSOLE PROVIDING A PLURALITY OF OPERATION METHODS FOR ONE COMMAND, ELECTRONIC DEVICE AND IMAGE PROCESSING APPARATUS PROVIDED WITH THE OPERATION CONSOLE, AND METHOD OF OPERATION

(75) Inventors: Takeshi Tani, Osaka (JP); Minami Sensu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 334 days.

(21) Appl. No.: 13/023,584

(22) Filed: Feb. 9, 2011

(65) Prior Publication Data

US 2011/0199639 A1    Aug. 18, 2011

(30) Foreign Application Priority Data

Feb. 18, 2010    (JP) ................................ 2010-033179

(51) Int. Cl.
G06F 3/12        (2006.01)
(52) U.S. Cl.
USPC ........ 358/1.15; 358/1.13; 358/1.14; 345/173; 345/174; 715/700; 715/718; 715/810
(58) Field of Classification Search
USPC ............... 358/1.13, 1.15, 1.14; 345/173, 174; 715/700, 718, 810
See application file for complete search history.

(56) References Cited

U.S. PATENT DOCUMENTS

| | | | |
|---|---|---|---|
| 5,912,659 A | 6/1999 | Rutledge et al. | |
| 7,030,862 B2 | 4/2006 | Nozaki | |
| 7,809,300 B2 | 10/2010 | Saeki et al. | |
| 2003/0063269 A1* | 4/2003 | Nozaki | ........................ 355/133 |
| 2005/0018658 A1 | 1/2005 | Ikeda et al. | |
| 2005/0219611 A1 | 10/2005 | Yamashita et al. | |
| 2006/0227106 A1 | 10/2006 | Hashimoto et al. | |
| 2007/0059032 A1 | 3/2007 | Yamada et al. | |
| 2007/0247641 A1 | 10/2007 | Okuma et al. | |
| 2008/0039202 A1 | 2/2008 | Sawano et al. | |
| 2008/0048986 A1 | 2/2008 | Khoo | |

(Continued)

FOREIGN PATENT DOCUMENTS

| | | |
|---|---|---|
| JP | 3-116193 A | 5/1991 |
| JP | 4-088412 A | 3/1992 |

(Continued)

OTHER PUBLICATIONS

Office Action dated May 7, 2013 for related U.S. Appl. No. 12/957,840, filed Dec. 1, 2010.

(Continued)

Primary Examiner — Jacky X Zheng
(74) Attorney, Agent, or Firm — Renner, Otto, Boisselle & Sklar, LLP

(57) ABSTRACT

In an image forming apparatus including a touch-panel display allowing a touch operation and a gesture operation, in order to enable easy customization of print setting screen image, a CPU of the image forming apparatus executes a program including: the step of displaying the print setting screen image in the custom-set display mode; upon detection by a user input, analyzing an input trajectory; if a request for changing preview display is made by a gesture, storing an icon mode with larger preview area as a custom-setting; and changing the preview on the print setting screen image displayed in the icon mode.

11 Claims, 23 Drawing Sheets

(56) References Cited

U.S. PATENT DOCUMENTS

| | | |
|---|---|---|
| 2009/0064023 A1 | 3/2009 | Kudo |
| 2009/0088218 A1 | 4/2009 | Kim et al. |
| 2010/0110031 A1* | 5/2010 | Miyazawa et al. ............ 345/173 |
| 2010/0283743 A1* | 11/2010 | Coddington ................. 345/173 |
| 2010/0289756 A1* | 11/2010 | Anzures et al. ............... 345/173 |
| 2011/0090151 A1 | 4/2011 | Huang et al. |
| 2011/0128247 A1* | 6/2011 | Sensu ........................... 345/173 |
| 2011/0199628 A1* | 8/2011 | Tohki et al. .................. 358/1.13 |
| 2011/0199629 A1* | 8/2011 | Sensu et al. .................. 358/1.13 |
| 2011/0199637 A1* | 8/2011 | Yoshida et al. ............. 358/1.15 |
| 2011/0199638 A1* | 8/2011 | Ogino et al. ................. 358/1.15 |
| 2011/0235110 A1* | 9/2011 | Tani et al. .................... 358/1.15 |
| 2011/0235130 A1* | 9/2011 | Okada .......................... 358/442 |
| 2011/0279848 A1* | 11/2011 | Watabe et al. ............... 358/1.13 |
| 2012/0008158 A1* | 1/2012 | Tani et al. .................... 358/1.13 |
| 2012/0019861 A1* | 1/2012 | Okada et al. ................. 358/1.15 |
| 2012/0019863 A1* | 1/2012 | Sensu et al. .................. 358/1.15 |
| 2012/0050779 A1* | 3/2012 | Tani et al. .................... 358/1.13 |
| 2012/0050807 A1* | 3/2012 | Noda et al. ................... 358/1.15 |
| 2012/0099130 A1* | 4/2012 | Tohki et al. .................. 358/1.13 |

FOREIGN PATENT DOCUMENTS

| | | |
|---|---|---|
| JP | 11-327760 A | 11/1999 |
| JP | 2000-148367 A | 5/2000 |
| JP | 2000-353042 A | 12/2000 |
| JP | 2003-345506 A | 12/2003 |
| JP | 2005-031882 A | 2/2005 |
| JP | 2005-174181 A | 6/2005 |
| JP | 2006-146330 A | 6/2006 |
| JP | 2006-293477 A | 10/2006 |
| JP | 2007-188054 A | 7/2007 |
| JP | 2007-293416 A | 11/2007 |
| JP | 2008-134918 A | 6/2008 |
| JP | 2009-064181 A | 3/2009 |
| JP | 2009-075656 A | 4/2009 |
| JP | 2009-169493 A | 7/2009 |
| JP | 2010-009365 A | 1/2010 |

OTHER PUBLICATIONS

Office Action for co-pending U.S. Appl. No. 12/957,840 mailed on Jan. 29, 2013.

* cited by examiner

OPERATION CONSOLE PROVIDING A PLURALITY OF OPERATION METHODS FOR ONE COMMAND, ELECTRONIC DEVICE AND IMAGE PROCESSING APPARATUS PROVIDED WITH THE OPERATION CONSOLE, AND METHOD OF OPERATION

CROSS-REFERENCE TO RELATED APPLICATION

This nonprovisional application claims priority under 35 U.S.C. §119(a) on Patent Application No. 2010-033179 filed in Japan on Feb. 18, 2010, the entire contents of which are hereby incorporated by reference. The present application is related to a co-pending U.S. patent application Ser. No. 12/957,840, owned by the same applicant.

BACKGROUND OF THE INVENTION

1. Field of the Invention

The present invention relates to an operation console functioning as a user interface and, more specifically, to an operation console providing two or more methods of operation (for example, a gesture operation/non-gesture operation (touch operation as will be described later)) for one operation device (touch-panel display) that accurately satisfies an operation request by the user. Further, the present invention relates to an electronic device and an image processing apparatus provided with such an operation console, as well as to an operation method.

2. Description of the Background Art

As one type of image processing apparatuses as electronic device, image forming apparatuses forming images on recording paper (typically, copy machines) are introduced to many places of business (companies and offices). In such a place of business, it has become increasingly common to connect an image forming apparatus having a printer function or a copy function to a network, to allow use (sharing) by a plurality of users. A multifunction peripheral (MFP) as one type of such image forming apparatuses has a plurality of basic operation modes such as a copy mode, a facsimile mode (hereinafter "facsimile" may also be denoted as FAX or fax), a network-supported printer mode and a scanner mode. In such an image forming apparatus, each user selects an operation mode and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such an image forming apparatus, for example, the user inputs image data in the scanner mode, performs image processing (such as collection) by inputting various instructions through an operation panel, and prints the results on a sheet of recording paper. In such a situation, the operation panel, serving as an operation and display unit, functions as an interface between the image forming apparatus and the user. Generally, on the operation panel, a screen image for setting functions in each operation mode is displayed, so that the user can easily set various functions. Further, while a job is being executed, job progress status may be displayed, to allow the user to easily grasp the progress status of the job. In the printer mode executed upon reception of data from an external device, the job progress status may be displayed in accordance with the data received from the external device as a source.

Recently, a touch-panel display having a touch-panel overlapped on a liquid crystal panel (display panel) comes to be increasingly used as such an operation panel. By way of example, items (software buttons) allowing selection of an operation mode of the image forming apparatus are displayed on the touch-panel display, the user viewing the display presses a position of an item displayed on the touch-panel display (presses a software button), and the operation mode is set.

Such a touch-panel display having both the display and operation functions is advantageous in that it eliminates the necessity of providing a display unit and an operation unit separately. Further, it attracts attention recently since a command can be selected advantageously in accordance with the user's sense, when it is adapted such that a command can be selected in accordance with a trajectory of pressing of the touch-panel display by the user's finger. Examples of such command selection using finger trajectory include the following.

When a plurality of pages are displayed on the touch-panel display as print previews, the following operations may be performed. By a user operation of lightly tapping twice (hereinafter also referred to as double-tapping) a position of a certain page displayed as a preview, a command to display the page in an enlarged or reduced size can be selected. By a user operation trajectory of expanding a space between two fingers (hereinafter also referred to as pinch-out or pinch-open), a command to display the page in an enlarged size can be selected, and by a user operation trajectory of reducing a space between the two fingers (hereinafter also referred to as pinch-in or pinch-close), a command to display the page in a reduced size can be selected. In the following, these operations are denoted as gesture operations. The gesture operations are not limited to the above, and may include: tapping, or lightly touching an item displayed on the touch-panel display; dragging, or sliding an item with a finger; flicking, or lightly sweeping an item to scroll; and pinching with two fingers. Strictly speaking, the tapping and double-tapping are not detected by the user operation trajectory on the touch-panel display (not the trajectory but simply a position is detected). However, in the present invention, any operation for detecting the user's request based on the operation trajectory of the user to the touch-panel display, including tapping and double tapping, will be referred to as a gesture operation, in consideration of the relation with other gesture operations. The user request may include a change in the manner of displaying a preview (for example, simple enlargement) and a change of print setting (for example, not a simple enlarged display but copying operation with the size enlarged).

Further, in the present specification, an operation other than the gesture operations as such will be described as a touch operation. The touch operation means an operation of detecting a user's request based on the position of operation by the user on the touch-panel display. A representative example of the touch operation is an operation of the user pressing a position of an item (pressing a software button) displayed on the touch-panel display.

In an MFP provided with a touch-panel display allowing both touch operation and gesture operation as an operation panel, it is possible for a user to adjust settings related to various image processing operations such as margin size, and make settings for finish, including stamping, stapling and punching. If such a finish function or functions are set for printing, the user cannot confirm the finished form until he/she obtains the result of actual printing. Therefore, it is not unusual that a user sets a finish with punched holes and when actually printed, the output is a failed copy having images overlapped with the positions of holes to be punched. This leads to waste of consumables (toner and recording paper).

In order to solve such a problem, Japanese Patent Laying-Open No. 2007-188054 (hereinafter referred to as '054 Reference) discloses an image forming apparatus in which a preview image of a finished form is displayed before actually printing a copy, allowing the user to change print setting as necessary.

The image forming apparatus includes: an image data input unit inputting image data; an image storage unit storing sample image data in advance; a tentative finished form information generating unit generating tentative finished form information expected when setting is done based on various pieces of setting information on the sample image data; an input screen image information generating unit generating input screen image information including setting process items for receiving various setting inputs related to the tentative finished form information; a display unit displaying the tentative finished form information and the input screen image based on the input screen image information; a setting unit outputting the contents of setting inputs received through the input screen image to the tentative finished form information generating unit, to realize the setting; and a copying unit executing the process for copying the image data input through the image data input unit, based on the tentative finished form information.

In the image forming apparatus, various items are set on the input screen image provided in accordance with the input screen image information and the tentative finished form information based on the sample image data. The tentative finished form information reflecting the setting is displayed on the display unit. Therefore, pre-scanning of a document becomes unnecessary, and hence the process of setting various items can be done at higher speed.

Further, Japanese Patent Laying-Open No. 2003-345506 (hereinafter referred to as '506 Reference) discloses a technique related to the gesture operation described above, in which when page collection is to be done to form an image, arrangement of pages is determined in accordance with a trajectory of the user's finger moved pressing on the touch-panel display.

As described above, various electronic devices as represented by the image forming apparatus and an image processing apparatus include a touch-panel display as an operation console. By the touch operation (position of pressing by the user on the touch-panel display) and the gesture operation (trajectory of pressing by the user on the touch-panel display) as described above to the touch-panel display (one operation device), user's request can be input. According to '054 Reference, touch-operation is exclusively used, while in '506 Reference, gesture operation is used in addition to the touch operation.

As regards the touch-panel display, some users are good at touch operations, some users are good at gesture operations, some may not be accustomed to the touch operations and others may not be accustomed to the gesture operation. In other words, preferable operation differs user by user. Further, it is often the case that pieces of information displayed on the touch-panel display are different on a screen image asking a touch operation by the user and on a screen image asking a gesture operation by the user. Considering an image forming apparatus shared by a large number of users, from the viewpoint of preference or accessibility of the user with respect to operations, it is preferred that a plurality of operation methods (touch operation/gesture operation) are prepared for one operation device (touch-panel display).

Such a configuration, however, may rather impair the operability, since a plurality of operations are prepared for selecting one command. Particularly, if different screen images are displayed for a touch operation and gesture operation and the preferred operation by the user does not match the display on the touch-panel display, the user would be confused. In addition, when a plurality of operation methods are prepared, the number of items to be displayed on the touch-panel display tends to be too large, or the number of image transitions may be undesirably increased, possibly lowering operability.

Regarding such a problem, '504 Reference simply discloses a technique of allowing print setting by a touch operation and displaying a preview using a sample image. Though gesture operation is disclosed in '506 Reference, this reference does not disclose a user interface considering the operation preference of the user.

More specifically, both '504 Reference and '506 Reference are silent about changing the manner of display based on a user operation to facilitate the next operation by the user, or changing the manner of display to facilitate the user to confirm the result of operation.

SUMMARY OF THE INVENTION

An object of the present invention is to provide, in an electronic device and an image processing apparatus (image forming apparatus) providing a plurality of operation methods (touch operation and gesture operation) for one command, a technique that allows easy customization to give priority to an operation method desired by the user, without necessitating special setting by the user.

According to an aspect, the present invention provides an operation console provided on an apparatus as an object of control. The operation console includes: a touch-panel display; a display control unit controlling the touch-panel display so that information to be notified to a user is displayed; and an input control unit, controlling the touch-panel display such that in response to a user touching the touch-panel display, either a request to the apparatus as the object of control or a request for changing manner of display on the touch-panel display is detected. The input control unit includes a first detecting unit detecting the request based on a position where the user touched the touch-panel display, and a second detecting unit detecting the request based on a trajectory of the user touched the touch-panel display. The second detecting unit is capable of detecting the same request as that detected by the first detecting unit. The display control unit includes a first display unit displaying a first information item corresponding to the first detecting unit, a second display unit displaying a second information item corresponding to the second detecting unit, and a changing unit for changing, if a user request is detected by the second detecting unit, manner of displaying the second information item.

In the operation console, if an operation of detecting a request based on the trajectory of the user touching the touch-panel display (the gesture operation described above) in accordance with the second information item displayed on the touch-panel display (for example, an object to be displayed in an enlarged size on the touch panel or an object to be subjected to enlargement process in the apparatus as the object of control) is detected, it is determined that the user prefers such an operation based on gesture. Since it can be determined that the gesture operation is preferred, the manner of display of the second information item corresponding to the gesture operation is changed. Here, the manner of display is changed such that the second information item is enlarged or the area of displaying the second information item is enlarged. Further, an operation not involving a gesture operation but only involving touching of the touch-panel display (touch operation) is determined to be not matching the user's preference, and the first information item corresponding to the touch operation is displayed relatively small (for example, an enlarged menu button is changed to a smaller icon button). In this manner, a screen image of the touch-panel display in accordance with the user's operation preference can easily be realized. As a result, when a plurality of operation methods (touch operation and gesture operation) are prepared for one request (one command) to the apparatus as the object of control, customization to give priority to the operation method desired by the user can easily be realized without necessitating any special setting by the user.

The changing unit may include a priority unit changing the manner of display such that the second information item is displayed with priority. The changing unit may include an area enlarging unit changing the manner of display such that display area of the second information item is enlarged.

In this manner, it is possible to display the second information item corresponding to the operation method preferred by the user with priority (the first information item is displayed relatively smaller), or to display the display area in an enlarged size (the display area of the first information item is displayed relatively smaller).

The second information item may be a preview item displaying, before execution, expected result when a process is executed by the apparatus as the object of control. Then, the changing unit may include an item enlarging unit changing the manner of display such that the preview item is displayed in enlargement when the display area of the second information item is enlarged.

Accordingly, when a gesture operation is made, the preview item as the second information item corresponding to the operation is displayed in an enlarged size. By way of example, assuming that the operation console is provided on an image forming apparatus, if an enlarged copy is requested by a gesture operation, the preview of enlarged copy is displayed in a larger size. Viewing the preview displayed on the touch-panel display, the user can easily confirm the result of processing requested by himself/herself.

The second information item may be a plurality of preview items displaying, before execution, expected result when a process is executed by the apparatus as the object of control. Then the changing unit may include an increasing unit changing the manner of display such that larger number of preview items are displayed when the display area of the second information item is enlarged.

Accordingly, when a gesture operation is made, the preview item as the second information item corresponding to the operation is displayed in a larger number. By way of example, assuming that the operation console is provided on an image forming apparatus, if a change of page order is requested by a gesture operation, a large number of pages including the substituted page is displayed as a preview. Viewing the preview displayed on the touch-panel display, the user can easily confirm the result of processing requested by himself/herself.

The first information item may be either an icon button or a software button displayed in a larger size than the icon button, corresponding to a request to the apparatus as the object of control. Then, the changing unit may include a button changing unit for changing the software button to the icon button, thereby to enlarge the display area of the second information item.

In this manner, when a gesture operation is made, the software button as the first information item corresponding to the touch operation is changed to a smaller icon button. Thus, the display area for the first information item is made smaller and the display area for the second information item can be enlarged.

The operation console may further include a returning unit controlling the touch-panel display such that the second information item is displayed with the changed manner of display restored.

Therefore, if the manner of display on the touch-panel display does not match the user's operation preference, the original state can easily be resumed.

The changing unit may include a manner changing unit changing manner of display of the second information item based on history of detection of a user's request by the first detecting unit and history of detection of a user's request by the second detecting unit. Here, the history may reflect operation preference of the user.

In this manner, the manner of display on the touch-panel display can be customized, reflecting the operation preference of the user. Specifically, the manner of display corresponding to a less frequently used operation method may not be displayed.

The operation console may further include a storage unit storing setting of manner of display of information items displayed on the touch-panel display based on history of detection of a user's request by the first detecting unit and history of detection of a user's request by the second detecting unit. Here, the history may reflect operation preference of the user.

In this manner, the setting related to the manner of display on the touch-panel display can be customized, reflecting the operation preference of the user. Specifically, the manner of display corresponding to a less frequently used operation method is not stored to be set, so that it is not displayed.

According to another aspect, the present invention provides an electronic device provided with the above-described operation console, and according to a still further aspect, the present invention provides an image processing apparatus provided with the above-described operation console.

In the electronic device and the image processing apparatus, even if a plurality of operation methods (gesture operation and touch operation) are prepared for the touch-panel display and the operation preference is different user by user, easy customization is possible to display information items giving priority to the operation method desired by the user without necessitating special setting by the user. Such an action is particularly effective in the electronic device or an image processing apparatus (image forming apparatus) shared by a large number of users.

According to a still further aspect, the present invention provides a method of operating an operation console provided on an apparatus as an object of control. The operation console includes a touch-panel display and an operation unit. The operation method includes: display control step of controlling the touch-panel display such that information to be notified to a user is displayed, using the operation unit; and input control step of controlling the touch-panel display such that in response to a user touching the touch-panel display, either a request to the apparatus as the object of control or a request for changing manner of display on the touch-panel display is detected, using the operation unit. The input control step includes a first detecting step of detecting the request based on a position where the user touched the touch-panel display, and a second detecting step of detecting the request based on a trajectory of the user touched the touch-panel display. At the second detecting step, the same request as that detected at the first detecting step can be detected. The display control step includes a first display step of displaying a first information item corresponding to the first detecting step, a second display step of displaying a second information item corresponding to the second detecting step, and a changing step of changing, if a user's request is detected by the second detecting step, manner of display of the second information item.

Thus, even if a plurality of operation(gesture operation and touch operation) are prepared and the operation preference is different user by user, the display on the touch-panel display can easily be customized, giving priority to the operation desired by the user, without necessitating special setting by the user.

According to the present invention, when a plurality of operation methods (gesture operation and touch operation) are prepared for one command in an electronic device including an image processing apparatus (image forming apparatus), customization to give priority to the operation method desired by the user can be realized easily without necessitating any special setting by the user.

The foregoing and other objects, features, aspects and advantages of the present invention will become more apparent from the following detailed description of the present invention when taken in conjunction with the accompanying drawings.

DETAILED DESCRIPTION OF THE EMBODIMENTS

Figure 1:
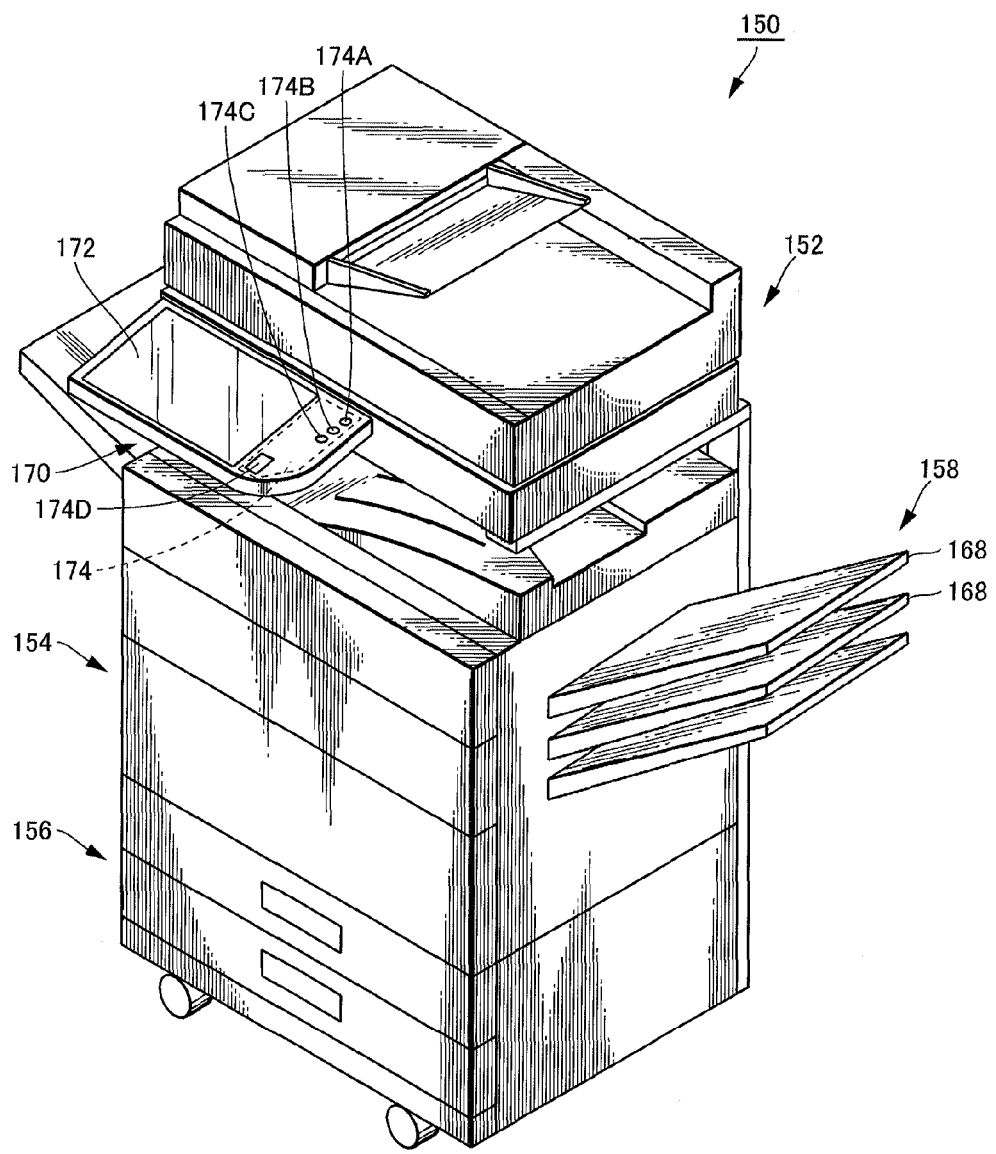
FIG. 1 is a perspective view showing an appearance of the image forming apparatus in accordance with a first embodiment of the present invention.

In the following description, the same components are denoted by the same reference characters. Their names and functions are also the same. Therefore, detailed description thereof will not be repeated.

<First Embodiment>

The electronic device in accordance with the first embodiment of the present invention is an image forming apparatus as one type of image processing apparatuses. The operation console in accordance with the present invention may be applicable to an image processing apparatus or electronic device other than the image forming apparatus. The electronic device in accordance with the present embodiment may be any device provided that a plurality of operation methods (touch operation and gesture operation) are provided for one command, and that it includes an operation console allowing easy customization to give priority to an operation method desired by the user without necessitating any special setting by the user.

An image forming apparatus 150 in accordance with the present embodiment can be operated by the gesture operation method and the touch operation method not involving the gesture operation. In this regard, the electronic device in accordance with the present embodiment is provided with a touch-panel display realizing such operation methods, as the operation device.

The image forming apparatus forms an image on a sheet of recording paper by electro-photography. The image forming apparatus includes, as the operation modes, copy mode, FAX mode (the display on the display panel is "FAX/IMAGE TRANSMISSION") and scanner mode (the display on the display panel is "DOCUMENT FILING"). The image forming apparatus may further include a network printer mode. The present invention, however, is not limited to the above, and the image forming apparatus having one or more of these three operation modes may be used. Further, the printing method is not limited to electro-photography.

[Image Forming Apparatus: Function]

Figure 2:
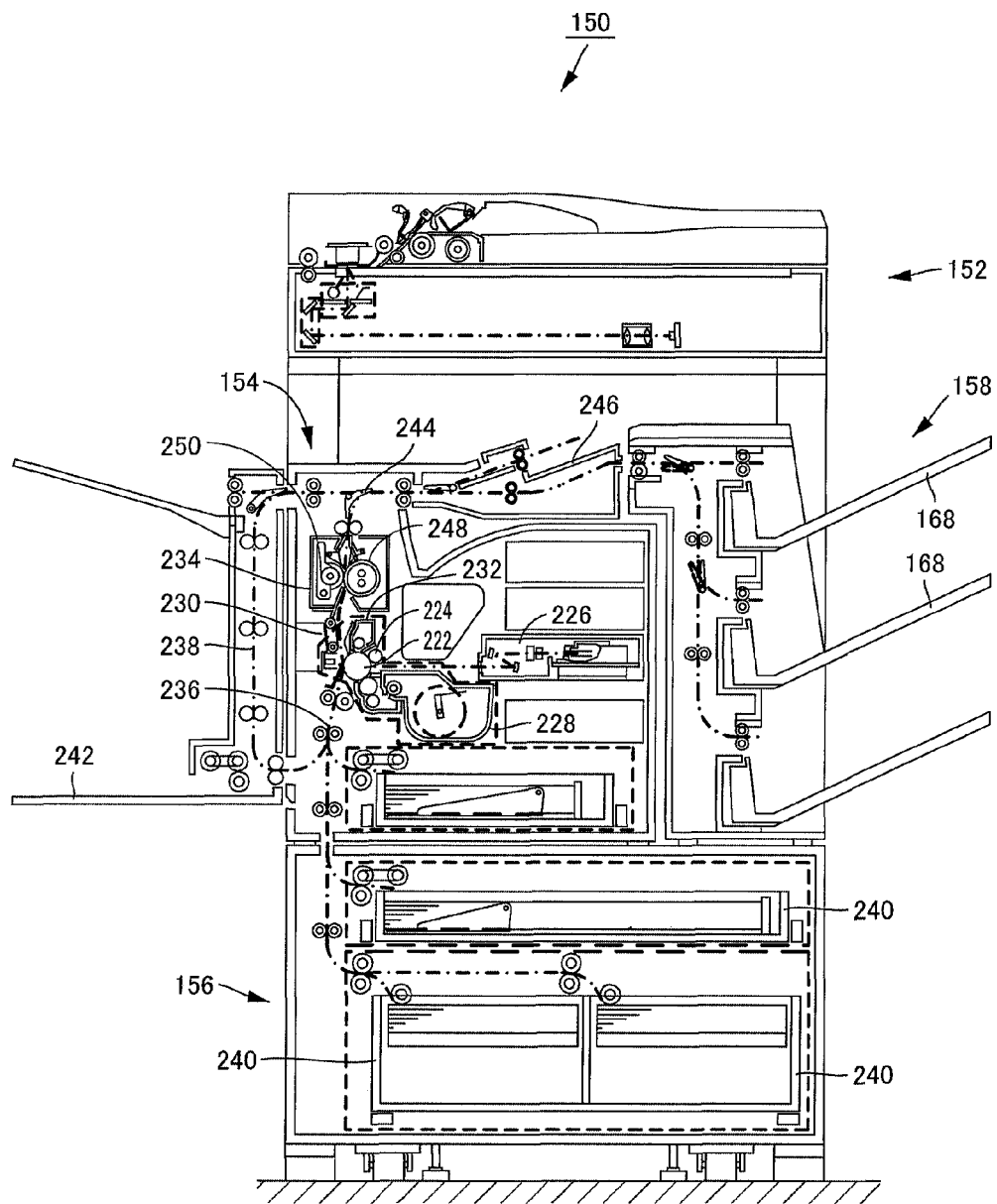
FIG. 2 schematically shows an internal configuration of the image forming apparatus shown in FIG. 1.
Figure 3:
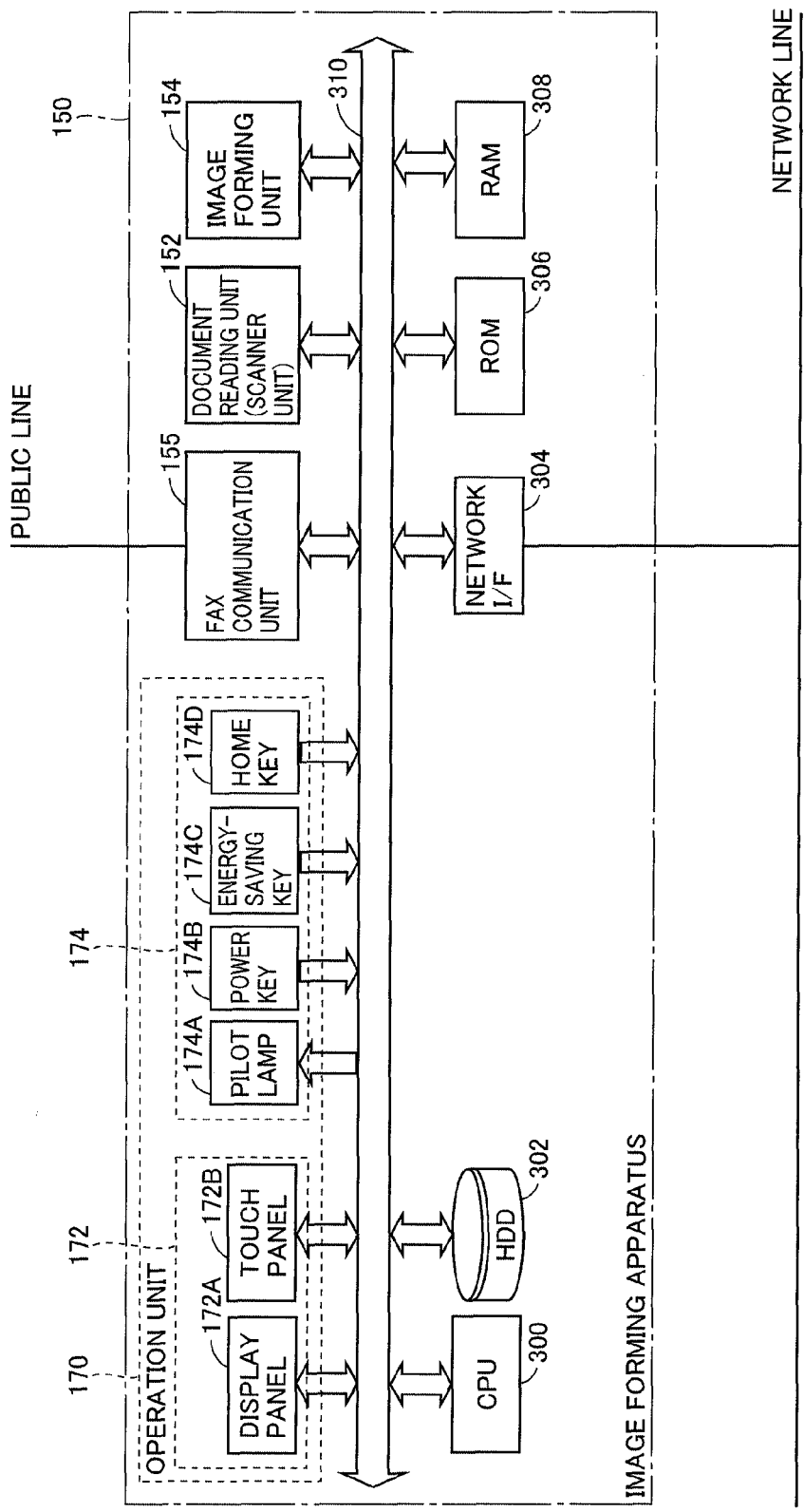
FIG. 3 is a functional block diagram showing a hardware configuration of the image forming apparatus shown in FIG. 1.

Referring to FIGS. 1 to 3, an image forming apparatus 150 in accordance with the embodiment of the present invention will be described.

Referring to FIGS. 1 to 3, image forming apparatus 150 includes a document reading unit 152, an image forming unit 154, a paper feed unit 156, a paper discharge unit 158 and an operation unit 170. Operation unit 170 is formed by a touch-panel display 172 and a display operation unit 174. Touch-panel display 172 includes a display panel 172A formed of a liquid crystal panel or the like, and a touch-panel 172B arranged overlapped on display panel 172A and detecting a position pressed by the user. Display operation unit 174 includes a pilot lamp 174A, a power key 174B, an energy-saving key 174C and a home key 174D.

As described above, image forming apparatus 150 in accordance with the present embodiment includes touch-panel display 172 as a main operation device, and further includes display operation unit 174 with hardware keys and a pilot lamp. The keys of display operation unit 174 (power key 174B, energy-saving key 174C and home key 174D) are implemented as hardware buttons, in contrast to the software buttons provided by touch-panel display 172. Image forming apparatus 150 is not limited to the one having display operation unit 174 of such a configuration, and it may be any apparatus including touch-panel display 172 and allowing input of a user request both by the gesture operation and the touch operation on touch-panel display 172. The operation modes of image forming apparatus 150 as such will be described.

Copy Mode

In the following, an operation in the copy mode will be described. In the copy mode, mainly document reading unit (also referred to as a scanner unit) 152 and image forming unit 154 operate to realize the copy function.

In image forming apparatus 150, a document placed on a platen is read by document reading unit 152 as image data. The read image data is input to CPU (Central Processing Unit) 300 implemented, for example, by a microcomputer shown in FIG. 3. The image data is subjected to various image processing operations here, and the resulting image data is output to image forming unit 154.

Image forming unit 154 is for printing an image of the document represented by the image data on a recording medium (in most cases, on a sheet of recording paper). Image forming unit 154 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 154, a main feeding path 236 and a reverse feeding path 238 are provided, and a sheet of recording paper fed from paper feed unit 156 is fed along main feeding path 236. Paper feed unit 156 draws out sheets of recording paper stacked on a paper feed cassette 240 or on a manual feed tray 242 one by one, and feeds the sheet of paper to main feeding path 236 of image forming unit 154.

While the sheet of recording paper is fed along main feeding path 236 of image forming unit 154, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operation mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 158.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 158.

The sheet of recording paper printed in the above-described manner is guided to paper discharge tray 246 or to paper discharge unit 158, and discharged to paper discharge tray 246 or to any of paper discharge trays 168 of paper discharge unit 158.

Paper discharge unit 158 may perform a process of sorting a plurality of printed sheets of paper to be output to different discharge trays 168, a process of punching each sheet of recording paper or a process of stapling the sheets of recording paper. Assume that a number of copies of the printing are to be prepared. In that case, sheets of recording paper are sorted and discharged to paper discharge trays 168 such that each tray 168 contains each set of printed sheets, and the set of printed sheets in each tray 168 is stapled or punched, whereby copies of prints are prepared.

Facsimile Mode

In the following, an operation in the facsimile mode will be described. In the facsimile mode, in the transmission operation, document reading unit (scanner unit) 152 and FAX communication unit 155 mainly operate and in the reception operation, FAX communication unit 155 and image forming unit 154 mainly operate, to realize the facsimile function.

Transmission Operation

In image forming apparatus 150, the facsimile mode is designated. A document placed on the platen is read by document reading unit 152 as image data. The read image data is input to CPU 300 implemented, for example, by a microcomputer shown in FIG. 3, the image data is subjected to various image processing operations here, and the resulting image data is output to a FAX communication unit (FAX communication unit 155 of FIG. 3).

FAX communication unit 155 of image forming apparatus 150 on the transmitting side connects a designated transmitting side line to a designated transmission destination, converts the image data to communication data in compliance with facsimile transmission standard, and transmits the converted data to a facsimile machine (such as an image forming apparatus 150 having the facsimile function) on the receiving side.

Communication Operation

When the line is connected, a FAX communication unit 155 of the image forming apparatus 150 on the receiving side detects a communication request signal from FAX communication unit 155 of image forming apparatus 150 on the transmitting side, and transmits an acknowledgement signal. Thereafter, by way of example, FAX communication units 155 on the transmitting and receiving sides pass performance information supported by transmitting side and receiving side, determine highest possible speed of communication and method of coding/code correction of image data, and set the method of communication of modems. Then, using the image signal format in compliance with the communication method, data is transmitted from FAX communication unit 155 of image forming apparatus 150 on the transmitting side to the FAX communication unit 155 of image forming apparatus 150 on the receiving side. When transmission ends, the line is disconnected.

Reception Operation

The FAX communication unit 155 of the image forming apparatus 150 on the receiving side converts the received data to image data and passes the data to an image forming unit 154. The received data may be converted to image data at the image forming unit 154. Image forming unit 154 prints an image of a document represented by the image data converted from the received data on a sheet of recording paper, in a manner similar to the operation in the copy mode described above.

Scanner Mode

In the following, an operation in the scanner mode will be described. In the scanner mode, mainly by the operation of document reading unit (scanner unit) 152, the scanner function is realized.

In image forming apparatus 150, a document placed on the platen is read by document reading unit 152 as image data. The read image data is input to CPU 300. The image data is subjected to various image processing operations here, and the resulting image data is stored in a storage device (hard disk 302 as will be described later) provided in image forming apparatus 150, or transmitted to a computer connected to the network through a network interface 304.

[Image Forming Apparatus: Control Block Configuration]

Referring to FIG. 3, image forming apparatus 150 further includes: operation unit 170 allowing setting of functions related to the copy mode, facsimile mode and the scanner mode: an ROM (Read Only Memory) 306 for storing programs and the like; a hard disk 302 as a non-volatile storage area capable of storing programs and data even when power is cut off; and an RAM (Random Access Memory) 308 providing a storage area when a program is executed.

Image forming apparatus 150 further includes a bus 310 connected to document reading unit 152, image forming unit 154, FAX communication unit 155, operation unit 170, ROM 306, hard disk 302, and RAM 308, and a CPU 300, connected to bus 310, for realizing general functions as the image forming apparatus.

ROM 306 stores programs and data necessary for controlling operations of image forming apparatus 150. CPU 300 controls image forming apparatus 150 in accordance with the programs and data stored in ROM 306, and executes control related to various functions of image forming apparatus 150.

As shown in FIG. 3, a public line is connected for transmitting/receiving image data, to FAX communication unit 155 of image forming apparatus 150. To network interface 304, a network line is connected. To the network line, a computer or the like using image forming apparatus 150 as a network-supported printer may be connected, or a computer or the like identified by a URL (Uniform Resource Locator) designated through the Internet may be connected. When connected to the Internet, image forming apparatus 150 can obtain necessary information through the Internet.

RAM 308 provides a function of a working memory for temporarily storing results of operations and processes by CPU 300, and a function of a frame memory for storing image data.

CPU 300 controls document reading unit 152, image forming unit 154, touch-panel display 172 and display operation unit 174 forming operation unit 170, ROM 306, hard disk 302, and RAM 308, by executing a prescribed program or programs. Operation unit 170 communicates with CPU 300 through an input/output interface.

Operation unit 170 is formed of a plate-shaped panel provided in an inclined manner to be easily viewable by the user. On a surface of operation unit 170, touch-panel display 172 is provided on the left side area, and display operation unit 174 (pilot lamp 174A and power key 174B, energy-saving key 174C and home key 174D as hardware buttons) is provided on the right side area. Touch-panel display 172 and display operation unit 174 form operation unit 170 as one integrated body as a whole.

As described above, touch-panel display 172 is formed of display panel 172A and touch-panel 172B arranged overlapped on display panel 172A. On display panel 172A of touch-panel display 172, a menu of operation modes in image forming apparatus 150, current state of image forming apparatus 150, status of destination designation, and status of job processing are displayed. On a display area of display panel 172A, selection buttons as software buttons are displayed. When a portion where the selection button is displayed is pressed, the pressed position is detected by the touch-panel 172B. By comparing the display position of the selection button and the position where the touch-panel 172B is pressed using a program, selection of an operation mode, setting of a function, and instruction of an operation of image forming apparatus 150 become possible. In addition to such a touch operation (command input operation based on the position of pressing by the user), image forming apparatus 150 also allows gesture operation (command input operation based on trajectory of operation by the user) as described above.

Pilot lamp 174A of display operation unit 174 is, for example, an LED (Light Emitting Diode). It is turned on/off (/flickered) under the control of CPU 300. When the user presses power key 174B provided separate from a main power switch, image forming apparatus 150 makes a transition from a standby mode (in which, for example, only the FAX receiving operation is possible with the main power on) to a normal mode, in which every operation mode of image forming apparatus 150 is usable. In this state, pilot lamp 174A is turned and kept on. If a predetermined time passes without any user operation, or if the user presses energy-saving key 174C, image forming apparatus 150 makes a transition from the normal mode to the energy saving mode. In the energy saving mode, only some of the operation modes of image forming apparatus 150 can be used. In this state, pilot lamp 174A flickers. Further, if the user presses energy-saving key 174C in the energy saving mode, the image forming apparatus 150 makes a transition from the energy saving mode to the normal mode. Home key 174D is a hardware key for returning the display of touch-panel display 172 to the initial state (home screen image). The processes performed when power key 174B, energy-saving key 174C and home key 174D are pressed are not limited to the above.

In a hardware button (power key 174B, energy-saving key 174C and home key 174D) of display operation unit 174, a key lamp, which is turned on/off (/flickered) under the control of CPU 300, may be embedded. By way of example, the key lamp provides a light ring around a circular key, or lights a central portion of the key. The key lamp is turned on when hardware buttons are allowed to be used as the operation device (when a process is executed if the hardware button is used).

The image forming apparatus 150 in accordance with the present embodiment includes the above-described three operation modes (copy mode, FAX mode (the display on the touch-panel display 172 is "FAX/IMAGE TRANSMISSION") and scanner mode (the display on the touch-panel display 172 is "DOCUMENT FILING")). On touch-panel display 172, software buttons for setting functions in respective operation modes and a preview as an expected form of image formation are displayed. The preview may be displayed in an icon mode in which a preview area is wide while texts of functions are not displayed, or a standard mode in which the preview area is narrow but the texts of functions are displayed. Image forming apparatus 150 realizes the characteristic portion of the present invention, that is, based on the operation of a user setting a function while viewing the preview displayed on touch-panel display 172, a screen image is customized to meet the operation preference of the user, without necessitating special setting by the user. Particularly, in image forming apparatus 150, based on an operation by the user, in order to facilitate the next operation by the user, display mode of touch-panel display 172 is changed, or to facilitate confirmation of the result of operation, the display mode of touch-panel display 172 is changed. Such a process is realized by software executed using the hardware configuration described above. In the following, the software configuration will be described. It is noted that display modes are not limited to the above.

[Software Configuration]

Figure 4:
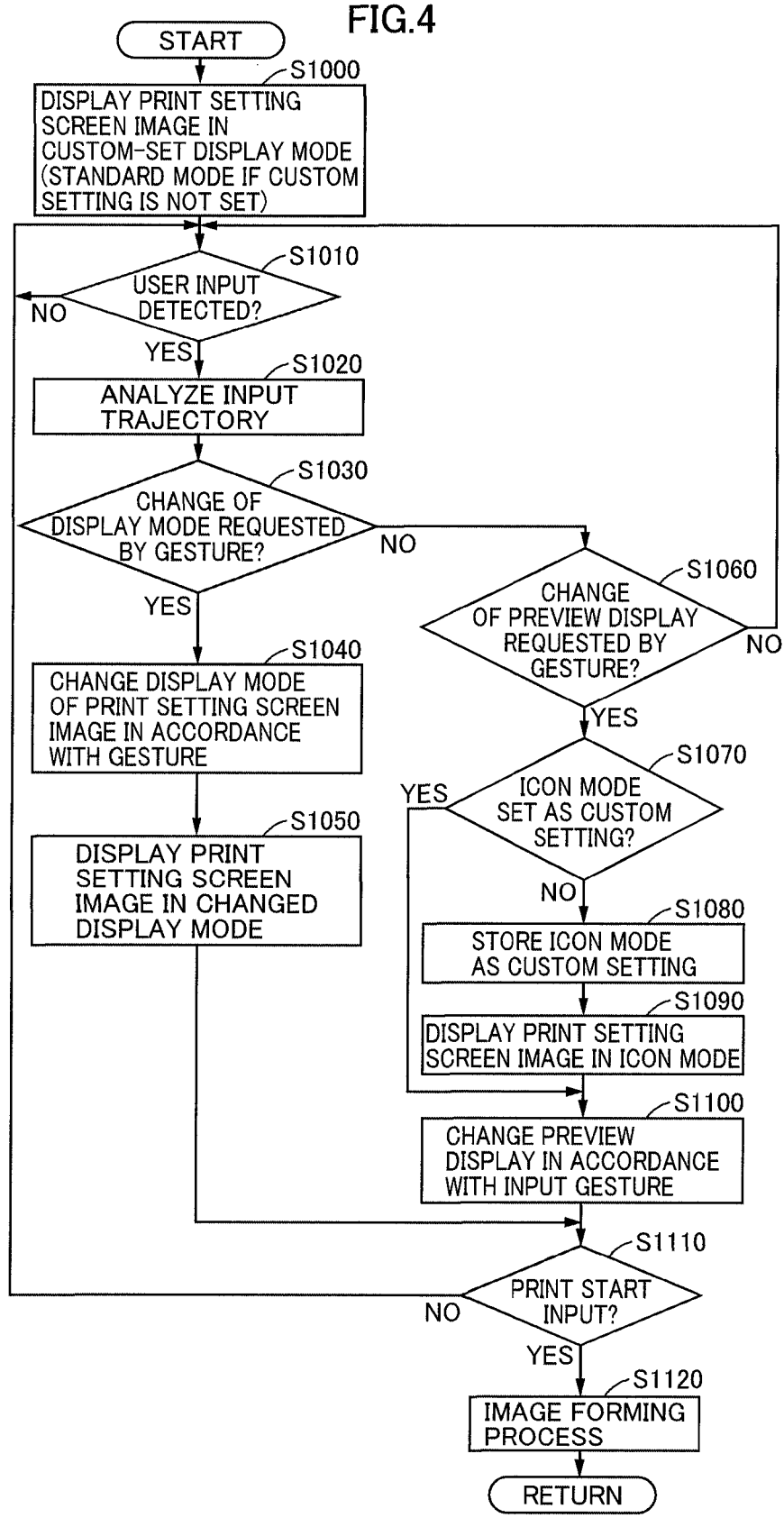
FIG. 4 is a flowchart representing a control structure of a program executed by the image forming apparatus in accordance with the first embodiment of the present invention.

FIG. 4 is a flowchart representing a control structure of a program executed by CPU 300 of image forming apparatus 150. CPU 300 of image forming apparatus 150 executes, in parallel with such a program, a program for realizing general functions of an image forming apparatus. The program, however, is not directly related to the characteristic portion of the present invention and, therefore, details thereof will not be described here.

Referring to FIG. 4, at step S1000, CPU 300 of image forming apparatus 150 (hereinafter simply referred to as CPU 300) displays a print setting screen image (screen image for setting functions related to printing) in a custom-set display mode on touch-panel display 172.

Here, the custom-set display mode refers to a mode set for displaying the print setting screen image on touch-panel display 172. Either the icon mode or standard mode is set as the custom-set display mode in hard disk 302. In a non-customized state until custom setting is done (initial state), the standard mode is stored as the custom-set display mode in hard disk 302.

In this process, regardless of the display mode, a plurality of function setting buttons are displayed on touch-panel display 172, together with the preview display before printing. The function setting buttons are displayed as software buttons of icons representing the functions (hereinafter referred to as "icon buttons") in the icon mode, and displayed by software buttons with text representation of functions (buttons larger than icons, hereinafter referred to as "text buttons") in the standard mode. Since icon buttons are smaller than text buttons, the preview display area in the icon mode is wider than the preview display area in the standard mode.

When a gesture operation is made in the preview display area, it is possible to input a command and an object of the command. By way of example, assume that a plurality of pages are displayed on touch-panel display 172 as a preview. If a gesture operation of pinch-out (pinch-open), or widening a space between two fingers, or a gesture operation of double-tapping, or lightly tapping twice, is made at a position where a certain page preview is shown, the preview page as the object of the command and the enlarged display as the command can be input together. As to the touch operation, by touching a position of a page displayed as a preview on touch-panel display 172 (by specifying the object of the command), and thereafter touching an icon button or text button for the enlarged display, the preview page as the object of the command and the enlarged display as the command can be input.

At step S1010, CPU 300 determines whether or not a user input has been detected. Here, CPU 300 determines whether or not the user input is detected, based on whether or not an item displayed on touch-panel display 172 is pressed by the user. The user input includes a gesture operation and a touch operation. If it is determined that the user input is detected (YES at step S1010), the process proceeds to S1020. Otherwise (NO at step S1010), the process returns to step S1010, and waits until it is determined that a user input is detected.

At step S1020, CPU 300 analyzes a trajectory of the user input. Here, CPU 300 detects the position pressed by the user and change with time of the position on touch-panel display 172, and compares the positions where the preview and buttons (icon buttons and text buttons) are displayed on touch-panel display 172 and the position and movement of the position where touch-panel 172B is pressed, whereby it analyzes whether or not a touch operation has been made, or a gesture operation (tap, double-tap, drag, flick, pinch, pinch-out and pinch-in) has been made.

At step S1030, CPU 300 determines whether or not the user operation is a request for changing display mode by a gesture operation. Here, if the result of analysis is a flick of an icon button displayed at an end portion of touch-panel display 172 to the central portion, CPU 300 determines that the gesture operation made by the user is a request for changing the display mode from the icon mode to the standard mode. If the result of analysis is a flick in the reversed manner, it is determined that the gesture operation made by the user is a request to change the display mode from the standard mode to the icon mode. If the user operation is determined to be a request to change the display mode by a gesture operation (YES at step S1030), the process proceeds to step S1040. Otherwise (NO at step S1030), the process proceeds to step S1060.

At step S1040, CPU 300 changes the display mode of the print setting screen image in accordance with, the gesture. At step S1050, CPU 300 displays the print setting screen image on touch-panel display 172, in the changed display mode. Thereafter, the process returns to step S1110.

At step S1060, CPU 300 determines whether or not the user operation is a request for changing the preview display by a gesture. Here, if the result of analysis is a pinch-out (pinch-open) or a double-tap of a position where a certain page is previewed, CPU 300 determines that the gesture operation made by the user is a request to display the page in an enlarged size. If the user operation is determined to be a request for changing the preview display by a gesture (YES at step S1060), the process proceeds to step S1070. Otherwise (NO at step S1060), the process returns to step S1010.

At step S1070, CPU 300 determines whether or not the icon mode is stored in hard disk 302 as the custom-setting. If the custom-setting is determined to be the icon mode (YES at step S1070), the process proceeds to step S1100. Otherwise (NO at step S1070), the process proceeds to step S1080.

At step S1080, CPU 300 stores the icon mode as the custom-setting, in hard disk 302. At step S1090, CPU 300 displays the print setting screen image in the icon mode.

At step S1100, CPU 300 displays the preview with the manner of display changed in accordance with the gesture by the user. Thereafter, the process proceeds to step S1110.

At step S1110, CPU 300 determines whether or not print start is input. Here, if "PRINT START" button displayed on touch-panel display 172 is pressed, CPU 300 determines that print start is input. If it is determined that print start is input (YES at step S1110), the process proceeds to step S1120. Otherwise (NO at step S1110), the process returns to step S1010.

At step S1120, CPU 300 prints a designated document on a sheet of recording paper, using image forming unit 154.

[Operation]

The operation of image forming apparatus 150 in accordance with the present embodiment based on the configuration and flowchart as above will be described with reference to FIGS. 5 to 9 showing examples of display on touch-panel display 172.

Display Mode (Standard Mode/Icon Mode)

Figure 5:
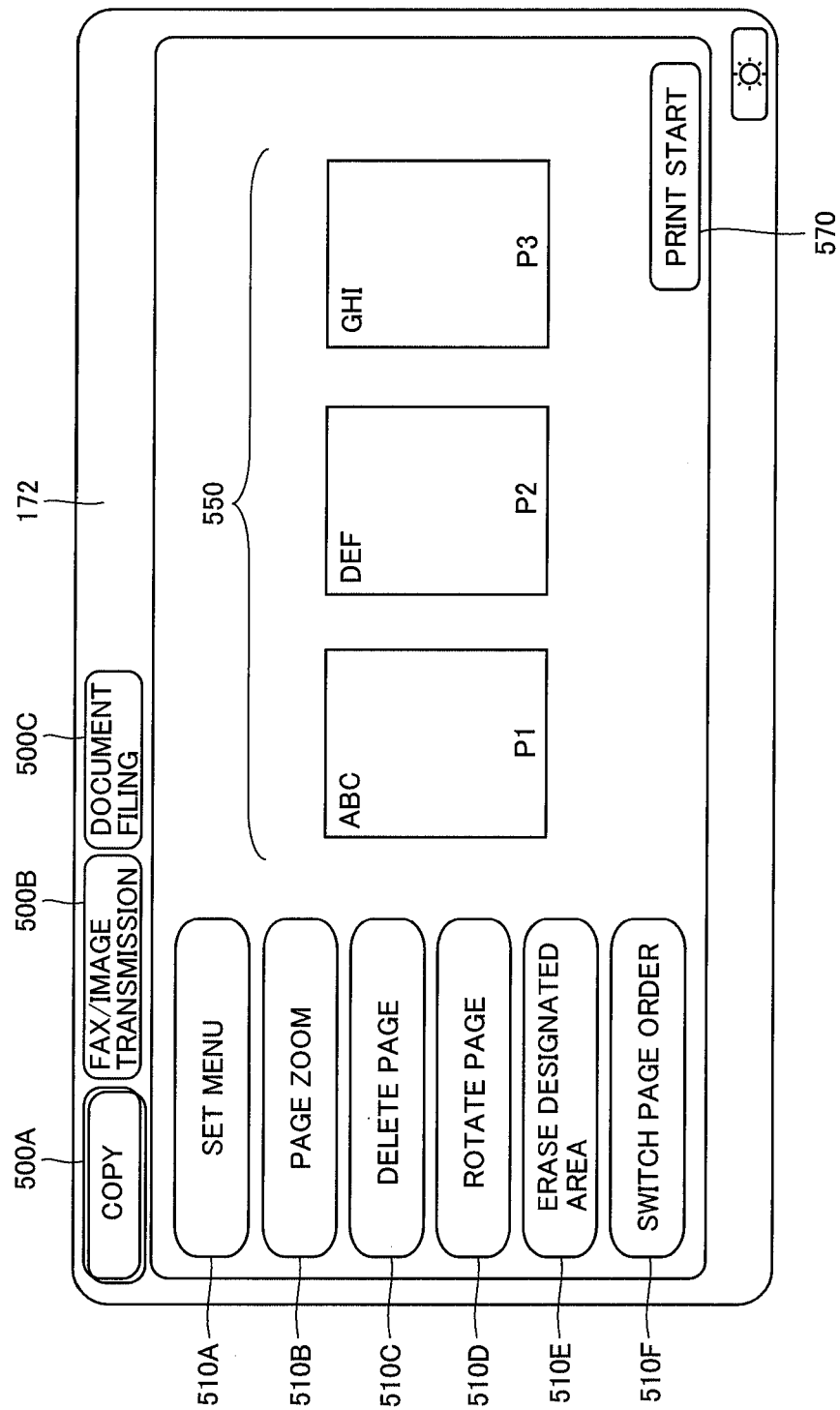
FIG. 5 is a (first) example of an image displayed on the display panel of the image forming apparatus in accordance with the first embodiment of the present invention.

Before describing the operation of image forming apparatus 150 in accordance with the present embodiment, the display mode of print setting screen image when the operation mode is the copy mode will be described. FIG. 5 shows an example of the screen image on which the print setting screen image is displayed in the standard mode on touch-panel display 172, and FIG. 6 shows an example of screen image shown in the icon mode.

Figure 6:
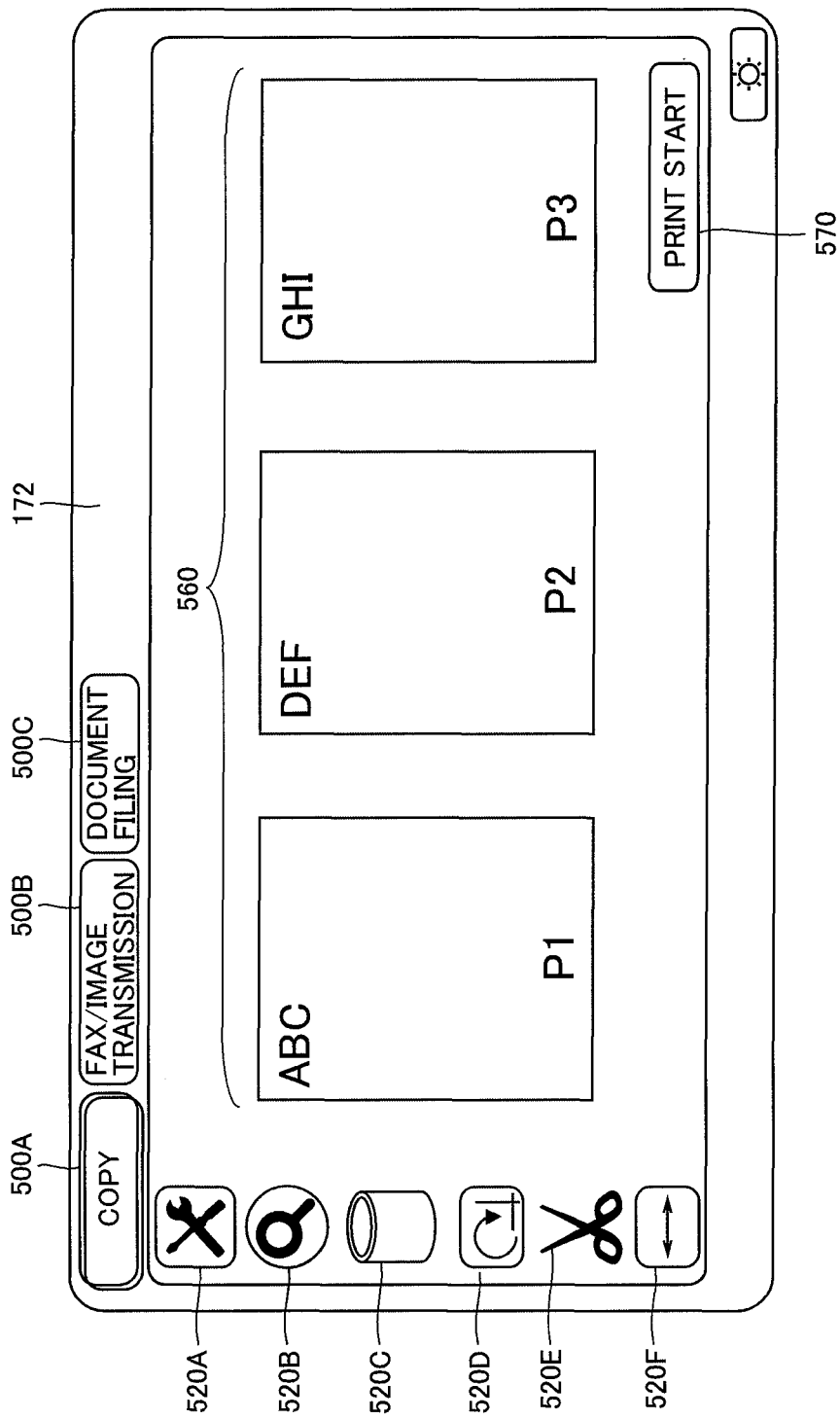
FIG. 6 is a (second) example of an image displayed on the display panel of the image forming apparatus in accordance with the first embodiment of the present invention.

As shown in FIGS. 5 and 6, both in the standard mode and icon mode, tag buttons (a copy mode selecting tag button 500A, a FAX mode selecting tag button 500B and a scanner mode selecting tag button 500C) for selecting the operation mode and a software button 570 by which the user requests "PRINT START" are displayed.

In the standard mode shown in FIG. 5, as text buttons for selecting a function, a setting menu button 510A, a page zoom button 510B, a page deletion button 510C, a page rotation button 510D, a designated area erasing button 510E and a page order switching button 510F are displayed on touch-panel display 172. These buttons are software buttons displaying as texts the names of functions selectable in the copy mode.

In the icon mode shown in FIG. 6, as icon buttons for selecting a function, a setting menu icon button 520A, a page zoom icon button 520B, a page deletion icon button 520C, a page rotation icon button 520D, a designated area erasing icon button 520E, and a page order switching icon button 520F are displayed on touch-panel display 172. These icon buttons are implemented by software buttons representing shapes of corresponding functions.

As described above, the icon buttons correspond to the text buttons, and smaller in size than the text buttons. Therefore, the preview display area in the icon mode is larger than the preview display area in the standard mode. As a result, it is possible to display preview image 560 shown in FIG. 6 in a larger size than the preview image 550 shown in FIG. 5 (if the same number of pages are displayed), or to display a larger number of pages (if the pages are displayed in the same size). Preview image 560 shown in FIG. 6 is an example when the same number of pages as in FIG. 5 is to be displayed as a preview, in which the image is shown larger than preview image 550 of FIG. 5.

Both in the standard mode and the icon mode, by an upward flick of an area where text button or an icon button is displayed, the displayed text buttons or icon buttons are scrolled, so that a further text button or icon button can be displayed.

Operation of Enlarging Preview Display by a Gesture Operation

Until the display screen image of touch-panel display 172 is customized and the icon mode is stored as the custom-setting in hard disk 302, the print setting screen image is displayed in the standard mode as shown in FIG. 5.

Assume that the print setting screen image is displayed in this manner on touch-panel display 172. In this state, if a user pinches out (pinches open) the position where the central page of three previewed pages is displayed as shown in FIG. 7(A) (YES at step S1010), the input trajectory is analyzed (step S1020). Here, the gesture operation by the user is analyzed to be a request to display the page in an enlarged size. Since this gesture is not a request for changing the display mode (NO at step S1030), whether or not it is a request to change the preview display by a gesture is determined (step S1060). Here, as the user made a gesture operation of pinch-out (pinch-open) on a preview image as shown in FIG. 7(A), it is determined to be a request for changing preview display by a gesture (YES at step S1060).

Since the custom-setting is the standard mode (NO at step S1070), the icon mode is stored in hard disk 302 as the custom-setting (step S1080), the print setting screen image is displayed with the display mode changed to the icon mode (step S1090), and the preview display is changed in accordance with the input gesture operation (step S1100). Here, the screen image shown in FIG. 7(B) is displayed on touch-panel display 172.

With the transition of screen image from FIG. 7(A) to FIG. 7(B), the text buttons for selecting functions are changed to icon buttons in the print setting screen image for the copy mode, and the display is changed to a larger preview image (assuming that preview of the same number of pages is displayed).

After such an operation, if the print setting screen image is further displayed on touch-panel display 172, the print setting screen image is displayed on touch-panel display 172 in the icon mode shown in FIG. 6, since it is set as the custom-setting. Thus, it is possible for the user to have a large preview image displayed on touch-panel display 172, without making an operation of switching the display mode.

By such an operation, the display mode is changed by a gesture operation by the user and the preview image is displayed in an enlarged size. Therefore, it is possible for the user to easily confirm the preview image without making an operation of changing the display mode.

Operation of Changing Display Mode (From Icon Mode to Standard Mode)

On touch-panel display 172 displaying the print setting screen image in the icon mode as shown in FIG. 8(A), if the user flicks an icon button displayed on touch-panel display 172 to the central portion of touch-panel display 172 (YES at step S1010), the input trajectory is analyzed (step S1020). Here, the gesture operation by the user is analyzed to be a request for changing the display mode from icon mode to standard mode. Since the gesture is a request for changing the display mode (YES at step S1030), the display mode of the print setting screen image is changed in accordance with the gesture (step S1040), and the print setting screen image is displayed on touch-panel display 172 in the standard mode as the changed display mode (step S1050). At this time, the screen image shown in FIG. 8(B) is displayed on touch-panel display 172.

With the image transition from FIG. 8(A) to FIG. 8(B), the display mode of print setting screen image for the copy mode is changed from the icon mode to the standard mode, the icon buttons for selecting functions are changed to the text buttons, and the preview image is changed to a smaller image (assuming that the same number of pages are previewed).

In this manner, as to the setting of display mode, the display of icon buttons for selecting functions can be changed to the display of text buttons by a gesture operation that intuitively corresponds to the image transition.

Operation of Changing Display Mode (From Standard Mode to Icon Mode)

On touch-panel display 172 displaying the print setting screen image in the standard mode as shown in FIG. 9(A), if the user flicks a text button displayed on touch-panel display 172 to an end portion of touch-panel display 172 (YES at step S1010), the input trajectory is analyzed (step S1020). Here, the gesture operation by the user is analyzed to be a request for changing the display mode from the standard mode to the icon mode. Since the gesture is a request for changing the display mode (YES at step S1030), the display mode of print setting screen image is changed in accordance with the gesture (step S1040), and the print setting screen image is displayed on touch-panel display 172 in the icon mode as the changed display mode (step S1050). At this time, the screen image shown in FIG. 9(B) is displayed on touch-panel display 172.

With the image transition from FIG. 9(A) to FIG. 9(B), the display mode of print setting screen image for the copy mode is changed from the standard mode to the icon mode, the text buttons for selecting functions are changed to the icon buttons, and the preview image is changed to a larger image (assuming that the same number of pages are previewed).

In this manner, as to the setting of display mode, the display of text buttons for selecting functions can be changed to the display of icon buttons by a gesture operation that intuitively corresponds to the image transition, and a larger preview image can be displayed.

As described above, in the image forming apparatus in accordance with the present embodiment, based on a gesture operation by the user, the display mode of touch-panel display can easily be changed to facilitate the confirmation of print setting by the user viewing a preview as the next operation. Further, the display mode can be changed by the gesture operation of the user that corresponds to the concept of screen image transition.

In the absence of any gesture operation for changing the display mode to the icon mode (flick of a text button) by the user, if the preview display is not changed by any gesture operation (pinch-out of a preview page or the like) for a predetermined time period, transition to the standard mode may be made. If it is determined that the preview display is frequently changed by the gesture operation of the user, the icon mode may be stored as custom-setting in hard disk 302. Preferably, the absence of any gesture operation in the predetermined time period, or the frequency of gesture operation may be managed user by user and the custom-setting may be stored accordingly. The purpose of such management is to reflect the operation preference of the user to custom-setting to be stored, to further facilitate use by the user.

<Modification of the First Embodiment>

An electronic device in accordance with a modification of the first embodiment above will be described in the following. The electronic device is similar to image forming apparatus 150 described above, and again, the electronic device of the present invention is not limited to such an image forming apparatus. Image forming apparatus 150 in accordance with the present modification executes a program different from the program executed by CPU 300 in the first embodiment described above. Specifically, while the display mode is changed and the manner of display of the preview image is changed by a gesture operation in the first embodiment, the print setting is changed by the gesture operation in the present modification. By way of example, when a user makes a pinch-out (pinch-open) operation at a position of a previewed page, the input trajectory is analyzed, and the gesture operation is analyzed to be a request for printing the page in an enlarged size, whereby the print setting is changed accordingly. Further, in the present modification, such a change of print setting is also realized by a touch operation. Such processes are realized by a software executed by the same hardware configuration as in the first embodiment described above. In the following, the software configuration will be described

[Software Configuration]

Figure 10:
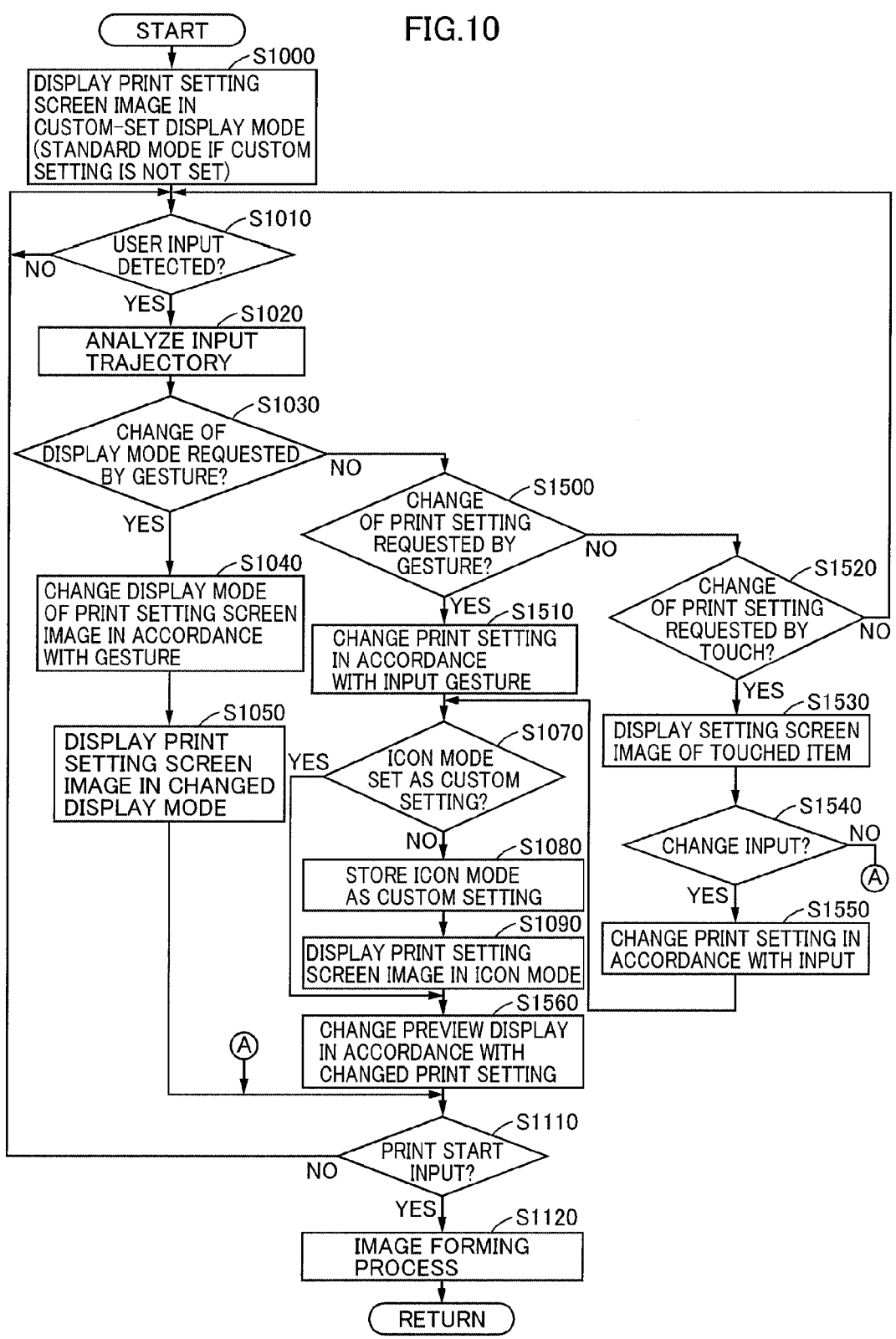
FIG. 10 is a flowchart representing a control structure of a program executed by the image forming apparatus in accordance with a modification of the first embodiment of the present invention.

FIG. 10 is a flowchart representing a control structure of a program executed by CPU 300 of image forming apparatus 150. FIG. 10 corresponds to FIG. 4 described above. The steps of the flowchart shown in FIG. 10 that are the same as those of the flowchart shown in FIG. 4 are denoted by the same step numbers. Since the processes are the same, description thereof will not be repeated here.

As in the first embodiment, in parallel with such a program, CPU 300 of image forming apparatus 150 executes a program for realizing general functions of an image forming apparatus and, since such a program is not directly related to the characteristic portion of the present invention, details thereof will not be described here. Further, as in the first embodiment, the description will be given assuming that the operation mode selected by the user is the copy mode. Even when other operation mode is selected, the characteristic part of the present invention is the same, and the characteristic part of the present invention is applicable regardless of the type of operation mode, as in the first embodiment.

Referring to FIG. 10, at step S1500, CPU 300 determines whether or not a user operation is a request for changing print setting by a gesture. Here, if the result of analysis is that the user has pinched out (pinched open) or double-tapped a position of a certain page displayed as a preview, for example, CPU 300 determines that the gesture operation by the user is a request for changing the print setting to copy the page in an enlarged size. If the operation by the user is determined to be a request for changing the print setting by a gesture (YES at step S1500), the process proceeds to step S1510. Otherwise (NO at step S1500), the process proceeds to step S1520.

At step S1510, CPU 300 changes the print setting in accordance with the user's gesture input through touch-panel display 172.

At step S1520, CPU 300 determines whether or not the user operation is a request for changing the print setting by a touch. By way of example, if the result of analysis is such that a position of a page displayed as a preview on touch-panel display 172 is touched by a user's finger and thereafter (after the page of which print setting is to be changed is selected) an icon button or text button of enlarged copy is touch-operated, CPU 300 determines that the touch operation by the user is a request for changing the print setting to have the page copied in an enlarged size. If the operation by the user is determined to be a request for changing print setting by a touch (YES at step S1520), the process proceeds to step S1530. Otherwise (NO at step S1520), the process returns to step S1010.

At step S1530, CPU 300 displays the screen image for setting print setting items corresponding to the touched icon button or text button, on touch-panel display 172. Here, by way of example, CPU 300 displays a pop-up screen image as the setting screen image on touch-panel display 172.

At step S1540, CPU 300 determines whether or not the user operated the setting screen image displayed on touch-panel display 172 and thereby input the change of any print setting item. Here, by way of example, if the software button of "200%" representing the zoom ratio of copy magnification displayed on the pop-up screen image is double-tapped, CPU 300 determines that the change of print setting item is input. If it is determined that the change of print setting item is input (YES at step S1540), the process proceeds to S1550. Otherwise (NO at step S1540), the process proceeds to step S1110.

At step S1550, CPU 300 changes the print setting in accordance with the touch of the user input through touch-panel display 172. Thereafter, the process proceeds to step S1070. Since the process proceeds to step S1070 after the end of step S1550, it is possible to display the preview in icon mode even when the change of print setting is requested by a touch operation.

At step S1560, CPU 300 displays the preview changed according to the changed print setting, on touch-panel display 172. Since the process of step S1560 is executed after the process of step S1510 (gesture operation) or step S1550 (touch operation), even when the change of print setting is requested by a gesture operation or by a touch operation, the preview image with the print setting changed can be displayed. Thereafter, the process proceeds to step S1110.

[Operation]

Figure 11:
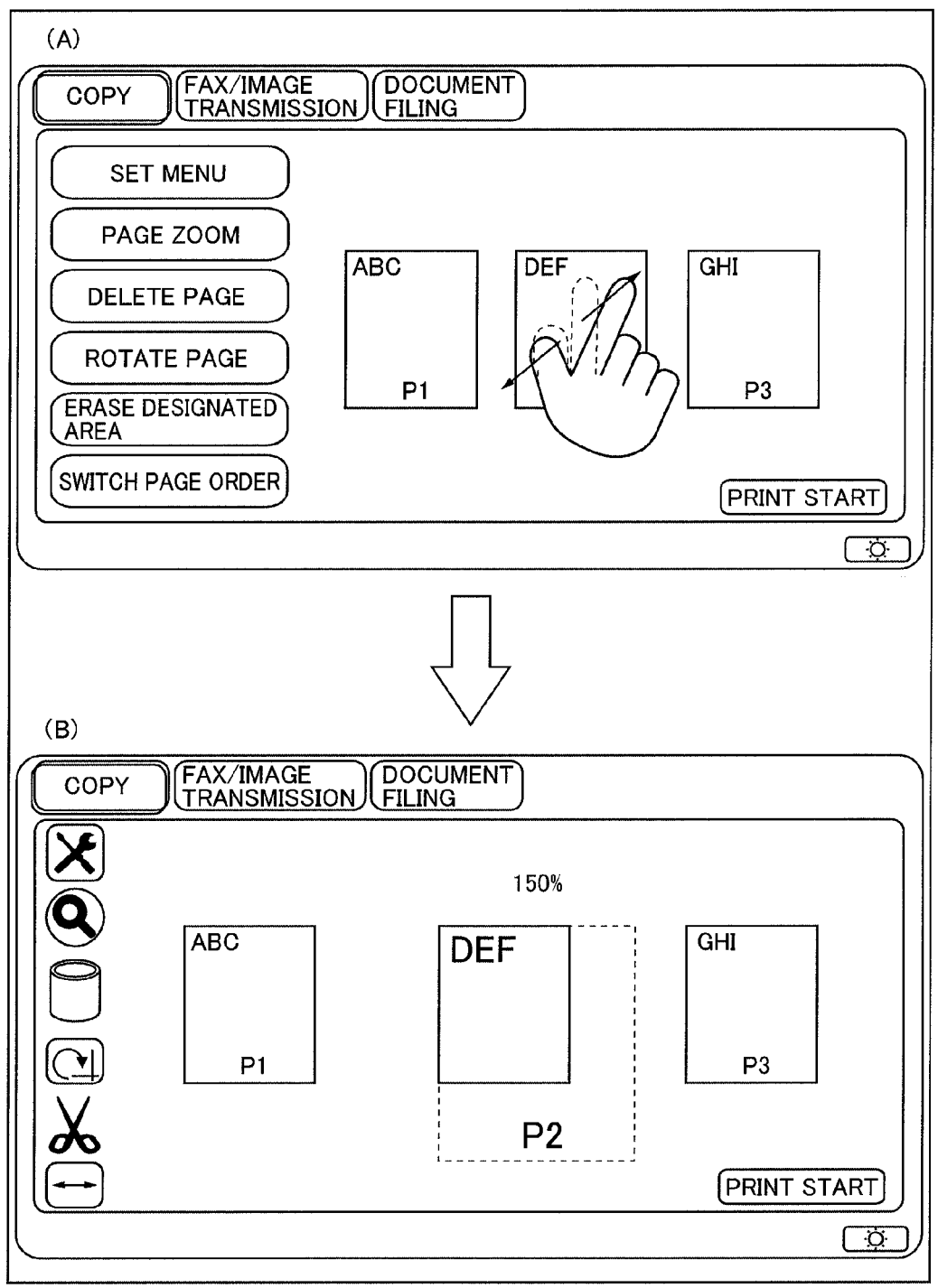
FIG. 11 is a (first) example of an image displayed on the display panel of the image forming apparatus in accordance with a modification of the first embodiment of the present invention.
Figure 12:
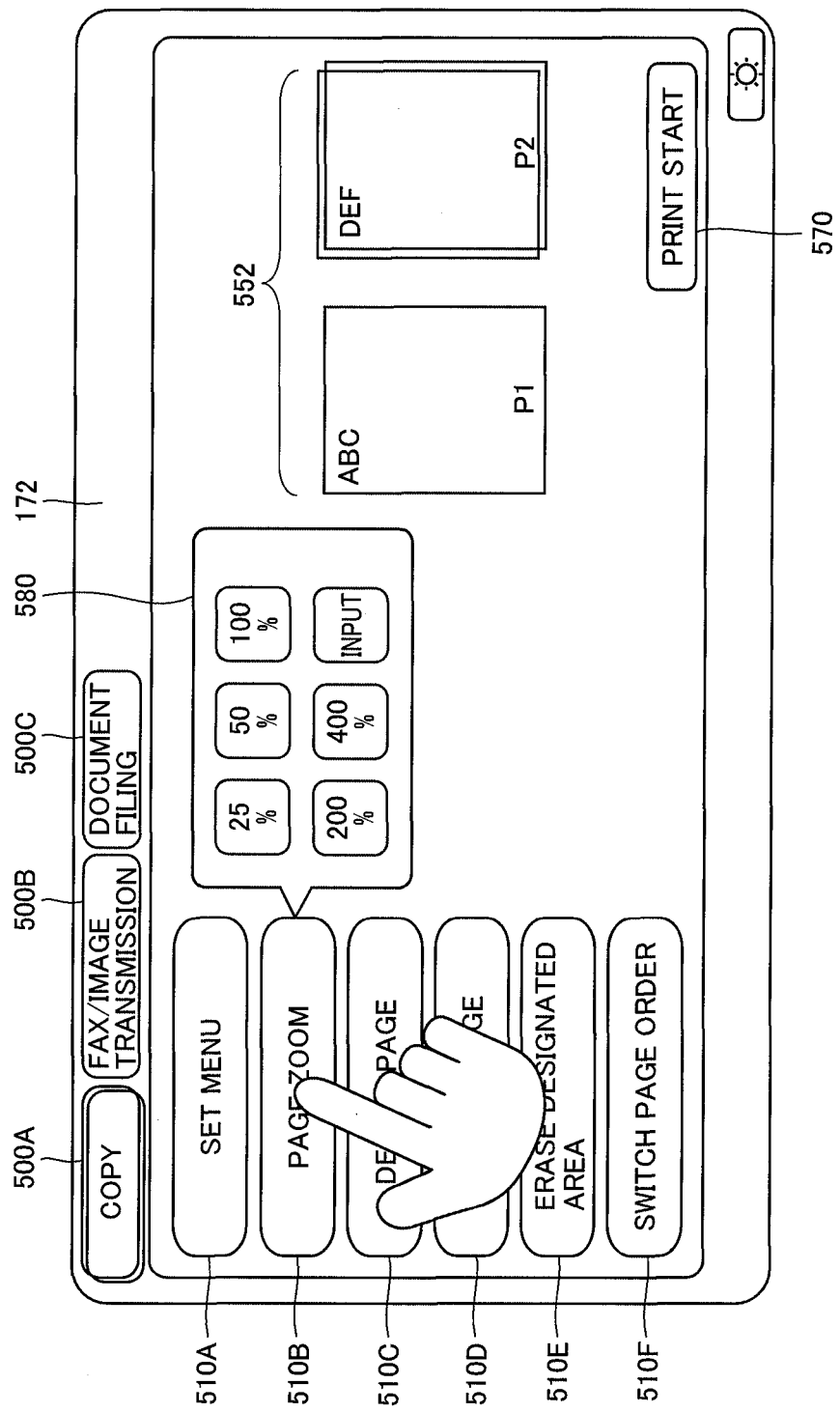
FIG. 12 is a (second) example of an image displayed on the display panel of the image forming apparatus in accordance with a modification of the first embodiment of the present invention.
Figure 13:
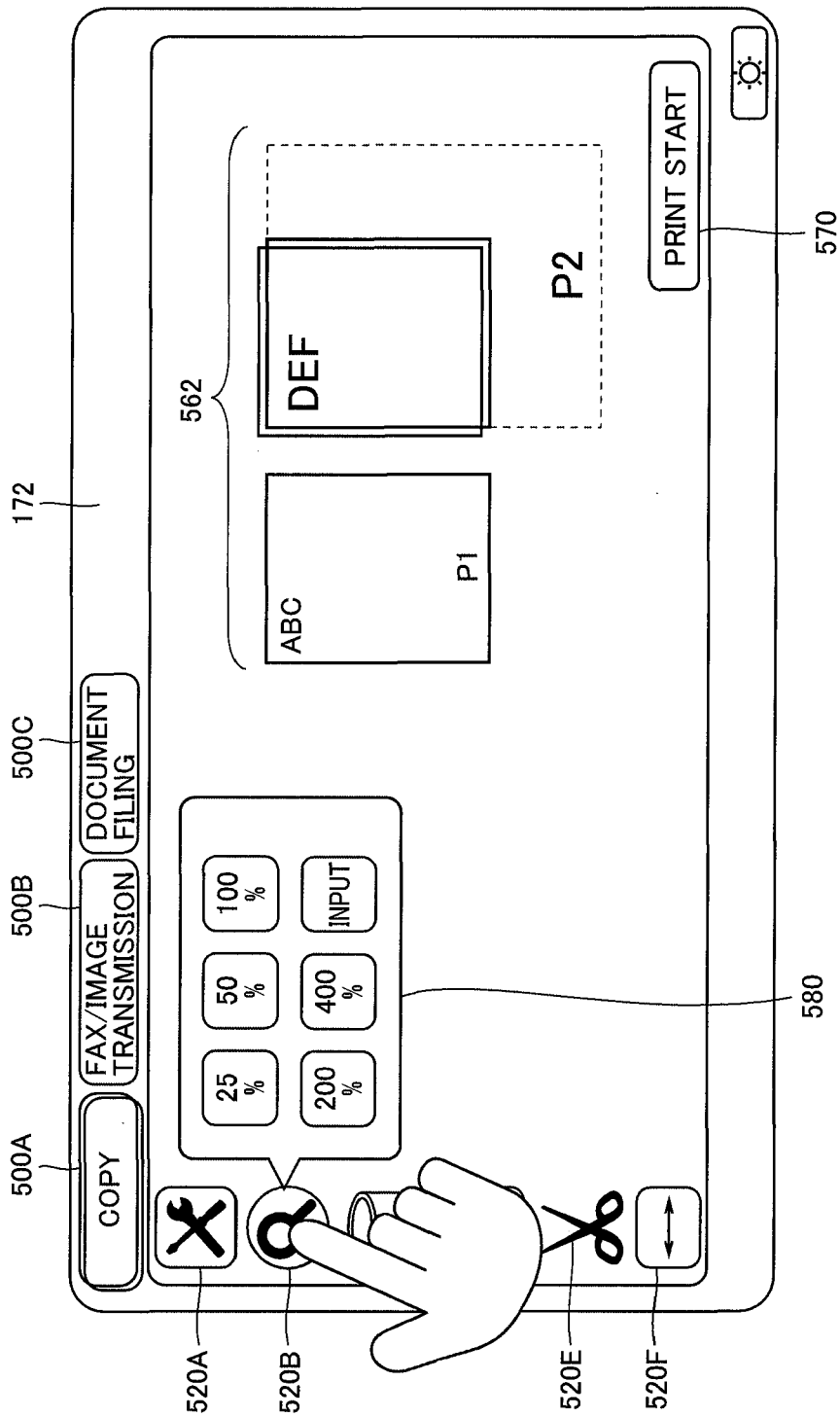
FIG. 13 is a (third) example of an image displayed on the display panel of the image forming apparatus in accordance with a modification of the first embodiment of the present invention.

The operation of image forming apparatus 150 in accordance with the present modification based on the configuration and flowchart as above will be described with reference to FIGS. 11 to 13 showing examples of display on touch-panel display 172.

Operation of Changing Print Setting by a Gesture Operation

Figure 7:
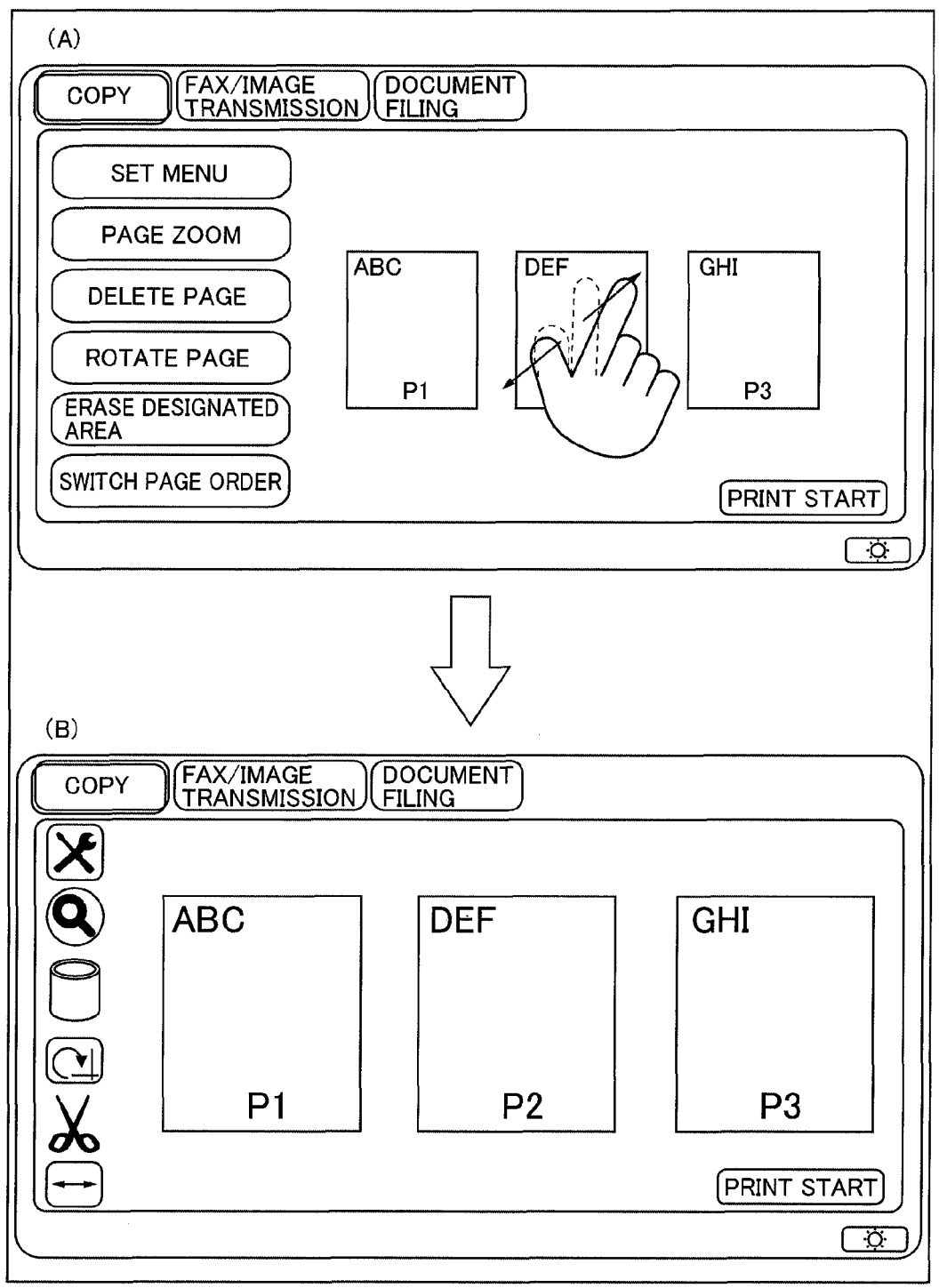
FIG. 7 is a (third) example of an image displayed on the display panel of the image forming apparatus in accordance with the first embodiment of the present invention.
Figure 8:
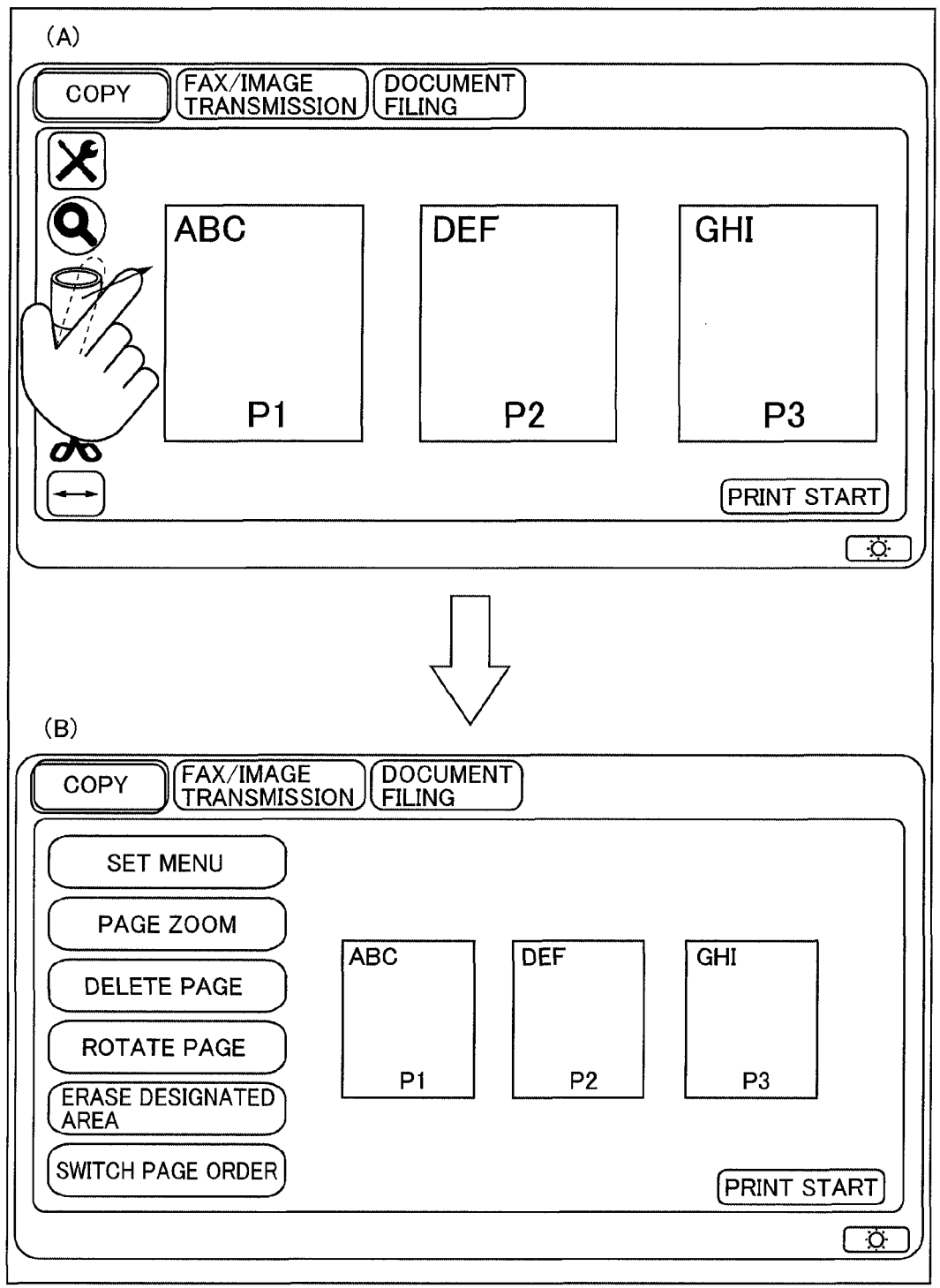
FIG. 8 is a (fourth) example of an image displayed on the display panel of the image forming apparatus in accordance with the first embodiment of the present invention.

For easier comparison with FIG. 7, in the description of operation, it is assumed that the display mode is the standard mode and that the print setting screen image is displayed on touch-panel display 172.

Assume that the print setting screen image is displayed in this manner on touch-panel display 172. In this state, if a user pinches out (pinches open) the position where the central page of three previewed pages is displayed as shown in FIG. 11(A) (YES at step S1010), the input trajectory is analyzed (step S1020). Here, the gesture operation by the user is analyzed to be a request to change the print setting of the page to enlarged copy. Since this gesture is not a request for changing the display mode (NO at step S1030), whether or not it is a request to change the print setting by a gesture is determined (step S1500). Here, as the user made a gesture operation of pinch-out (pinch-open) on a preview image as shown in FIG. 11(A), it is determined to be a request for changing the print setting by a gesture (YES at step S1500).

Since the custom-setting is the standard mode (NO at step S1070), the icon mode is stored in hard disk 302 as the custom-setting (step S1080), and the print setting screen image is displayed in the icon mode (step S1090).

In accordance with the input gesture operation, the print setting of the central page is changed to enlarged copy (step S1510), and the preview display is changed in accordance with the changed print setting (step S1560). Here, an image of FIG. 11(B) is displayed on touch-panel display 172.

With the transition of screen image from FIG. 11(A) to FIG. 11(B), the text buttons for selecting functions are changed to icon buttons in the print setting screen image for the copy mode, and the display is changed to a larger preview image (assuming that preview of the same number of pages is displayed). It can be seen from the comparison between FIGS. 11(A) and 11(B) that the left page and the right page are previewed with the size of recording paper and the size of characters on the document unchanged, and that the central page is previewed with the same paper size but with enlarged size of document characters in FIG. 11(B). In this manner, since the print setting of the central page is changed to enlarged copy, the document area (represented by dotted lines) is larger than the frame (represented by solid lines) of recording paper as shown in FIG. 11(B). Here, the magnification ratio of enlarged copy may be set, for example, by the width of user's pinch-out (pinch-open) operation. It is preferred to indicate the magnification ratio (here, "150%") as shown in FIG. 11(B). The method of setting which part of enlarged document is to be printed will be described later.

After such an operation, if the print setting screen image is to be still displayed on touch-panel display 172, the print setting screen image is displayed in the icon mode as shown in FIG. 11(B) on touch-panel display 172, since it is set as the custom-setting. In this manner, it is possible for the user to have a large preview image displayed on touch-panel display 172 without performing an operation of switching the display mode, and to easily confirm the print setting such as enlarged copy.

In this manner, since the print setting is changed, display mode is changed and the preview image is displayed in an enlarged size by the gesture operation of the user, it is possible for the user to easily confirm the print setting using the preview image, without performing an operation of switching the display mode.

Operation of Changing Print Setting by a Touch Operation

On touch-panel display 172 displaying the print setting screen image in the standard mode as shown in FIG. 5, if the user touches a position of a central page among three previewed pages and thereafter (after the page of which print setting is to be changed is selected) touches the text button of "PAGE ZOOM" (YES at step S1010), the input trajectory is analyzed (step S1020). At this time, the series of touch operations by the user is analyzed to be a request for changing the print setting of the page to zoom copy. Since the gesture is not a request for changing the display mode (NO at step S1030) or a request for changing print setting by a gesture (NO at step S1500), whether it is a request for changing print setting by touching is determined (step S1520). Here, since the user touched and thereby selected a page of which print setting is to be changed on the preview image (in FIG. 12, the selected state is indicated by a double frame; same in the following), and touched the text button of "PAGE ZOOM," it is determined to be a request for changing print setting by touching (YES at step S1520).

In the vicinity of "PAGE ZOOM" text button, a setting screen image 580 related to the touched "PAGE ZOOM" pops up and displayed (step S1530). If the software button of "200%" displayed on setting screen image 580 is double-tapped by the user, it is determined that a change is input (YES at step S1540).

In accordance with the input touch operation, the print setting for the central page is changed to enlarged copy (magnification ratio of 200%) (step S1550), and the preview display is changed in accordance with the changed print setting (step S1560).

Since the custom-setting is the standard mode (NO at step S1070), the icon mode is stored in hard disk 302 as the custom-setting (step S1080), and the print setting screen image is displayed in the icon mode (step S1090). Here, on touch-panel display 172, the page as the object of enlarged copy is displayed in enlargement, as shown in FIG. 13, with the display mode changed from the standard mode to the icon mode.

In accordance with the input touch operation, the print setting of the central page is changed to enlarged copy (step S1550), and in accordance with the changed print setting, the preview display is changed (step S1560).

In this manner, as in the case of gesture operation of the user, since the print setting is changed, display mode is changed and the preview image is displayed in an enlarged size by the touch operation of the user, it is possible for the user to easily confirm the print setting using the preview image, without performing an operation of switching the display mode.

The foregoing description relates to an example when the display mode is the standard mode. The operation is similar even when the display mode is the icon mode. An example of display on touch-panel display 172 in that case is shown in FIG. 13, which corresponds to FIG. 12. Here, since the print setting screen image has been displayed in the icon mode, the page as the object of enlarged copy is displayed in enlargement also in the icon mode.

In this manner, since the print setting is changed, display mode is changed as needed (if display has been given in the icon mode, the mode is kept unchanged) and the preview image is displayed in an enlarged size by the touch operation of the user, it is possible for the user to easily confirm the print setting using the preview image displayed in enlargement in the icon mode, without performing an operation of switching the display mode.

As described above, in accordance with the present modification, by the gesture operation or touch operation, the print setting can be changed and the user can easily confirm the change in print setting.

It is also possible to classify the gesture operation of requesting the change in preview display in accordance with the first embodiment and the gesture operation requesting the change in print setting in accordance with the modification, and to appropriately combine the first embodiment and its modification.

<Second Embodiment>

In the following, an electronic device in accordance with a second embodiment of the present invention will be described. Similar to the first embodiment, the electronic device in accordance with the present embodiment is an image forming apparatus as one type of image processing apparatuses. As in the first embodiment, the operation console in accordance with the present invention is applicable to an image processing apparatus or an electronic device other than such an image forming apparatus.

The electronic device in accordance with the present embodiment includes, as a display mode, a menu mode in addition to the standard mode and icon mode described above. The menu mode is used when, though a preview is displayed on the touch-panel display, the user changes a plurality of print settings at one time basically without confirming the displayed preview. For this operation, in the menu mode, a setting menu screen image larger than the text buttons in the standard mode are displayed on most of the areas on touch-panel display 172.

In the image forming apparatus in accordance with the present embodiment, based on an operation of the user selecting the menu mode who wants to collectively change print settings using the menu mode as such, the display mode is automatically changed from the icon mode or standard mode to the menu mode. Here, in the first embodiment described above, the custom-setting is changed to the icon mode, once a gesture operation is made. In the present invention, the custom-setting is changed to the menu mode if the operation of selecting the menu mode is done a predetermined number of times. This approach of counting the number of mode selection and changing custom-setting if the count reaches a predetermined number may be adopted in the first embodiment.

The electronic device in accordance with the present embodiment may be any device that includes an operation console provided with a plurality of operation screen images (icon mode, standard mode and menu mode) for commands related to print setting, allowing easy customization to give priority to an operation screen image required by the user without necessitating any special setting by the user.

The image forming apparatus (FIGS. 1 to 3) is the same as that of the first embodiment described above. Therefore, detailed description thereof will not be repeated here.

In image forming apparatus 150 in accordance with the present embodiment, the control structure of a program executed by CPU 300 differs from that of the first embodiment. Except for this point, the present embodiment is the same as the first embodiment. The structure and functions are the same as those of the first embodiment and, therefore, detailed description thereof will not be repeated here.

[Software Configuration]

Figure 14:
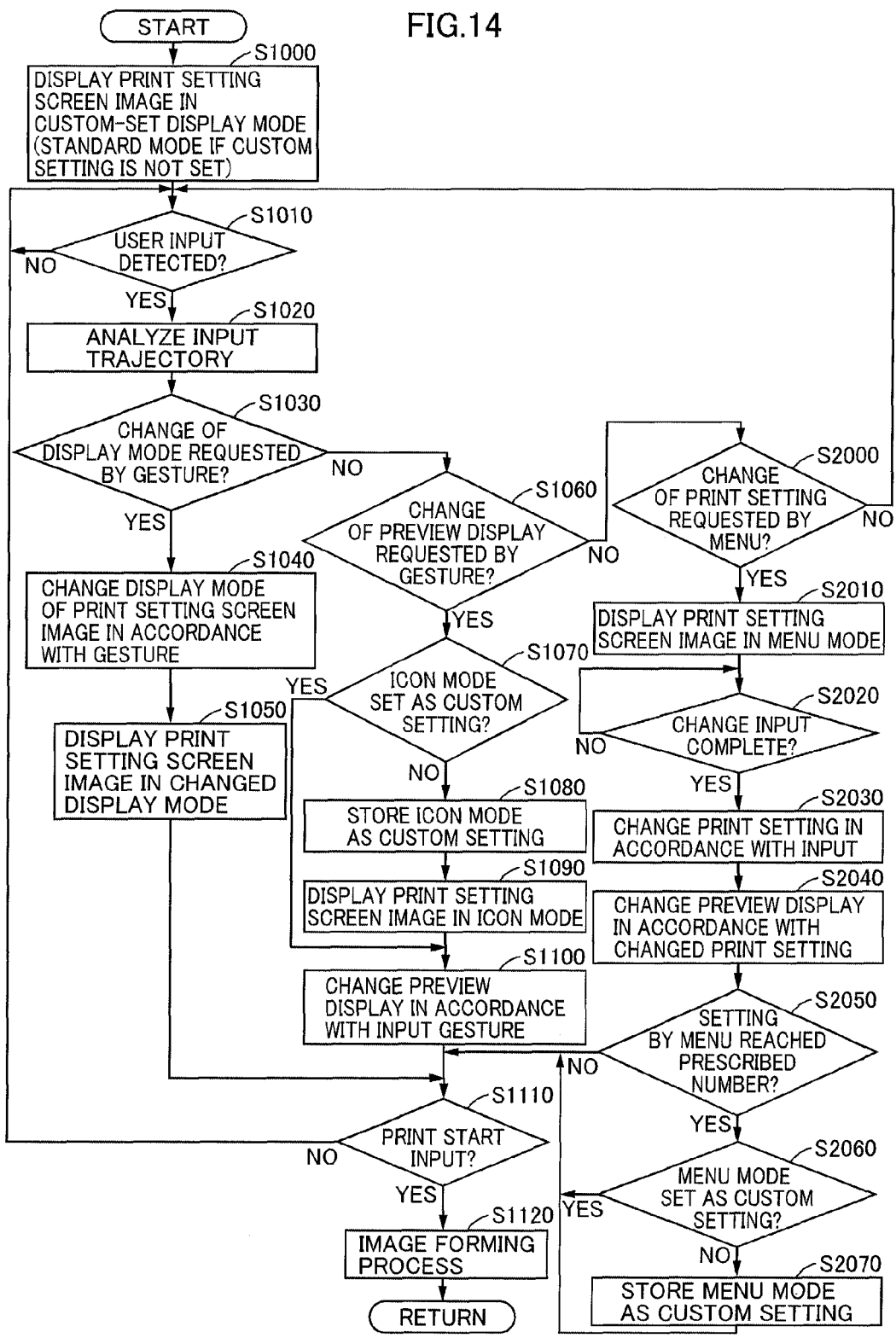
FIG. 14 is a flowchart representing a control structure of a program executed by the image forming apparatus in accordance with a second embodiment of the present invention.
Figure 15:
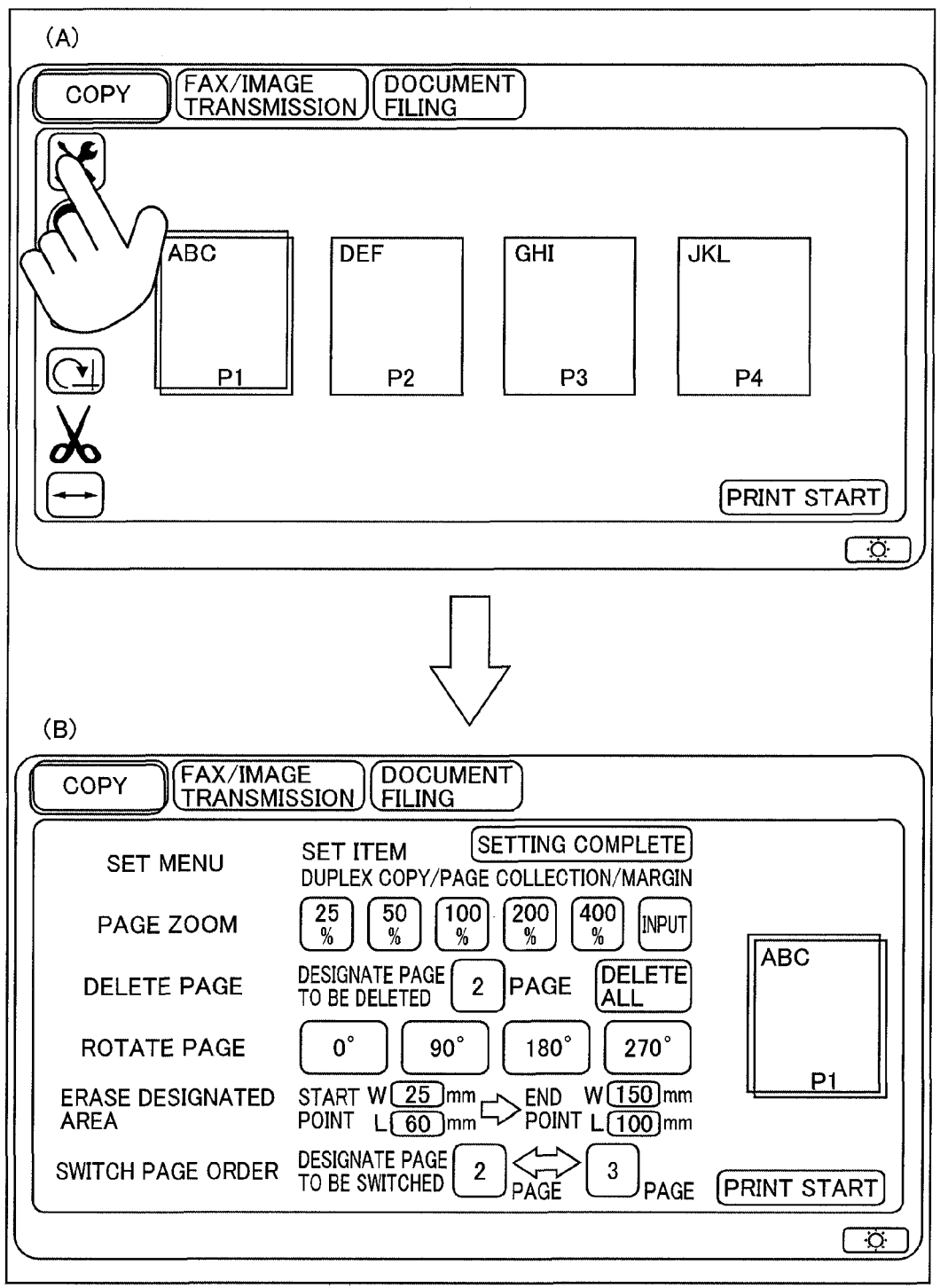
FIG. 15 is a (first) example of an image displayed on the display panel of the image forming apparatus in accordance with the second embodiment of the present invention.

FIG. 14 is a flowchart representing a control structure of a program executed by image forming apparatus 150 in accordance with the present embodiment. The flowchart shown in FIG. 14 corresponds to the flowchart shown in FIG. 4 of the first embodiment. The flowchart of FIG. 14 includes the process of steps S2000 to S2070, added to the process steps of the flowchart shown in FIG. 4. In the flowchart shown in FIG. 14, the same process steps as those of the flowchart of FIG. 4 are denoted by the same step numbers. Since the processes of these steps are the same, description thereof will not be repeated here.

As in the first embodiment described above, CPU 300 of image forming apparatus 150 executes, in parallel with such a program, a program for realizing general functions of an image forming apparatus. The program, however, is not directly related to the characteristic portion of the present invention and, therefore, details thereof will not be described here.

Referring to FIG. 14, at step S2000, CPU 300 determines whether or not a user operation is a request for changing print setting through the menu. Here, if the result of analysis is that a position of a page displayed as a preview on touch-panel display 172 is touched by a user's finger (a page of which print setting is to be changed is selected) and thereafter an icon button or text button of, for example, a "setting menu" is touched, CPU 300 determines that the touch operation by the user is a request for changing the print setting of the page using the setting menu screen image. If the user operation is determined to be a request for changing the print setting using the menu (YES at step S2000), the process proceeds to step S2010. Otherwise (NO at step S2000), the process returns to step S1010.

At step S2010, CPU 300 displays the setting menu screen image allowing collective setting of print setting items, on touch-panel display 172. Here, CPU 300 displays the setting menu screen image on most of the area of touch-panel display 172.

At step S2020, CPU 300 determines whether or not the setting menu screen image displayed on touch-panel display 172 is operated by the user and the input of changing print setting item or items has been complete. Here, by way of example, if a software button of "setting complete" displayed on the setting menu screen image is double-tapped, CPU 300 determines that input for changing the print setting item or items has been complete. If it is determined that input for changing the print setting item or items has been complete (YES at step S2020), the process proceeds to step S2030. Otherwise (NO at step S2020), the process returns to step S2020.

At step S2030, CPU 300 changes print setting in accordance with the user operation input through the setting menu screen image displayed on touch-panel display 172.

At step S2040, CPU 300 displays the preview display changed in accordance with the changed print setting, on touch-panel display 172.

At step S2050, CPU 300 determines whether or not the number of print settings using the setting menu screen image has reached a predetermined number. If the number of print settings using the setting menu screen image is determined to have reached the predetermined number (YES at step S2050), the process proceeds to step S2060. Otherwise (NO at step S2050), the process returns to step S1110.

At step S2060, CPU 300 determines whether or not the menu mode is stored in hard disk 302 as the custom-setting. If it is determined that the custom-setting is the menu mode (YES at step S2060), the process proceeds to step S1110. Otherwise (NO at step S2060), the process proceeds to step S2070.

At step S2070, CPU 300 stores the menu mode as the custom-setting in hard disk 302. Thereafter, the process proceeds to step S1110.

[Operation]

The operation of image forming apparatus 150 in accordance with the present embodiment based on the configuration and flowchart as above will be described with reference to FIGS. 15 to 20 showing examples of display on touch-panel display 172.

Operation of Print Setting Using Menu Operation

While the print setting screen image is displayed in the icon mode on touch-panel display 172, if the user touches a position of the leftmost page of previewed four pages as shown in FIG. 15(A) (selecting the page of which print setting is to be changed) and thereafter touches the icon button of "setting menu" (YES at step S1010), the input trajectory is analyzed (step S1020). Here, the analysis is that the user operation is a request for changing print setting of the page using the setting menu screen image. The gesture is neither a request for changing the display mode (NO at step S1030) nor a request for changing the preview display (NO at step S1060) and, therefore, whether it is a request for changing the print setting using the menu is determined (step S2000). Here, the user touched and selected the page of which print setting is to be changed on the preview image and then touched the icon button of "setting menu" as shown in FIG. 15(A). Therefore, it is determined to be a request for changing the print setting using the menu (YES at step S2000).

The print setting screen image is displayed in the menu mode, and the setting menu screen image is displayed on touch-panel display 172 (step S2010). Here, as shown in FIG. 15(B), on touch-panel display 172, the setting menu screen image for setting the print setting items is displayed (step S2010). At this time, a part of preview image is displayed as shown in FIG. 15(B).

Assume that "200%" of page zoom is touched, "90°" of page rotation is touched and the software button of "setting complete" is double-tapped, on the setting menu screen image. Then, it is determined that inputs for the change have been complete (YES at step S2020). In accordance with the user operation input using the setting menu screen image, the print setting is changed (step S2030), and in accordance with the changed print setting, the preview display is changed (step S2040).

Until the number of print setting using the setting menu screen image reaches the predetermined number (NO at step S2050), the custom-setting is not updated and maintained to be the icon mode or standard mode. If the number of print setting using the setting menu screen image reaches the predetermined number (YES at step S2050) and the custom-setting has not been set to the menu mode (NO at step S2060), the custom-setting is set to the menu mode, and stored in hard disk 302 (step S2070).

By such an approach, if the number of operations of the setting menu screen image by the user reaches a predetermined number, the display mode is changed and the setting menu screen image allowing collective change of print settings is displayed. Therefore, without necessitating any operation to change the display mode, the user can easily change the print setting.

Figure 16:
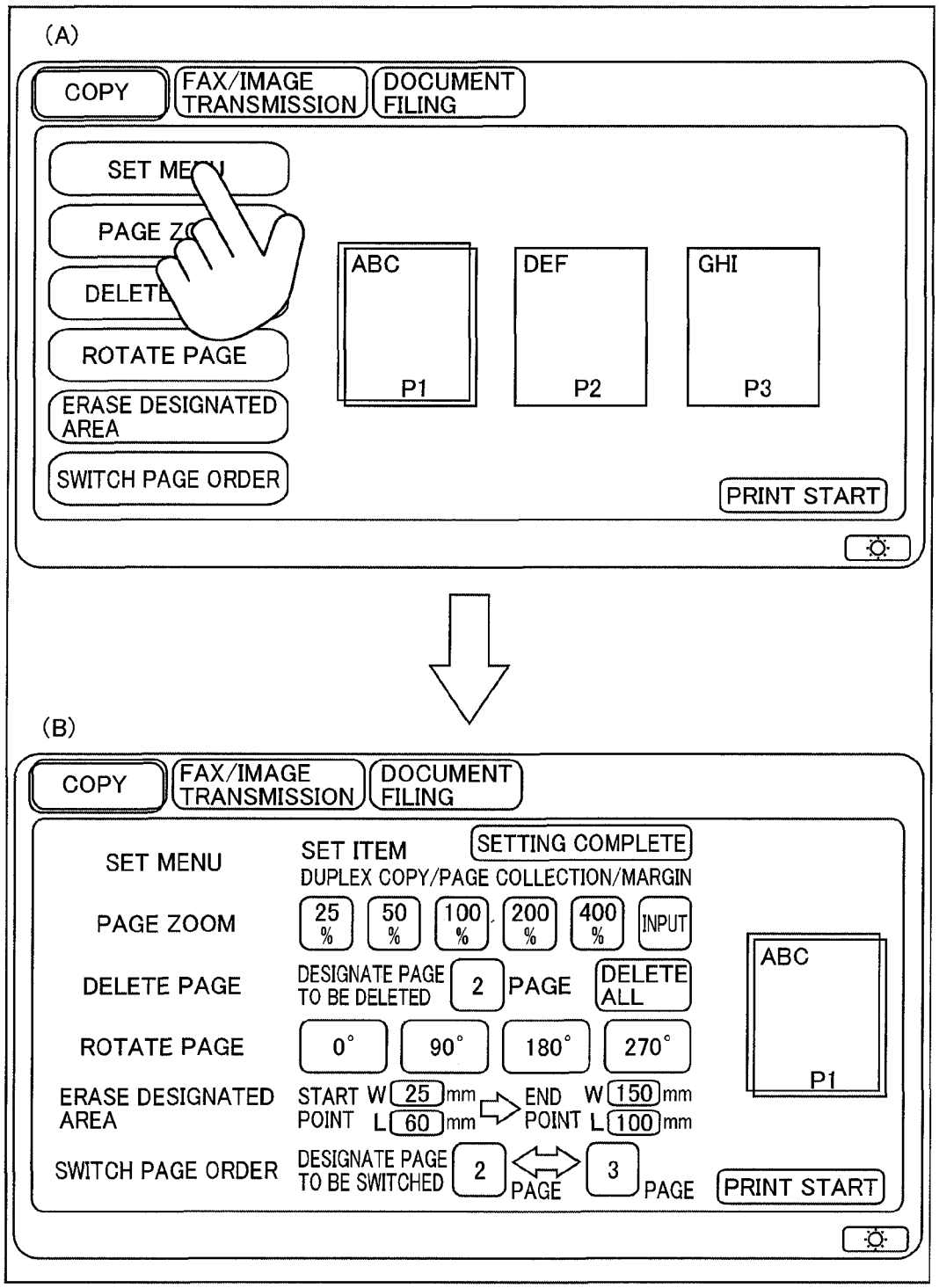
FIG. 16 is a (second) example of an image displayed on the display panel of the image forming apparatus in accordance with the second embodiment of the present invention.
Figure 17:
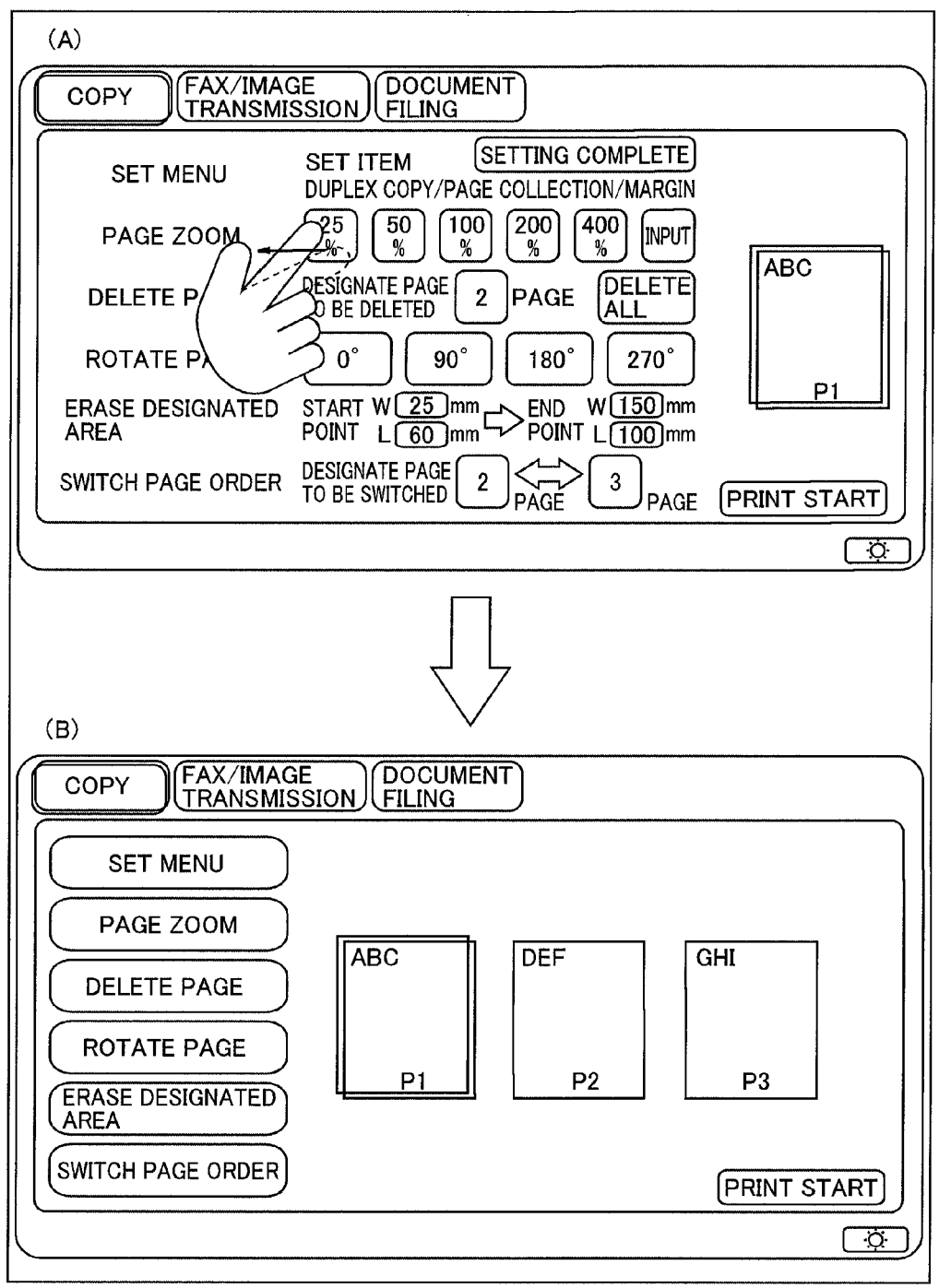
FIG. 17 is a (third) example of an image displayed on the display panel of the image forming apparatus in accordance with the second embodiment of the present invention.
Figure 18:
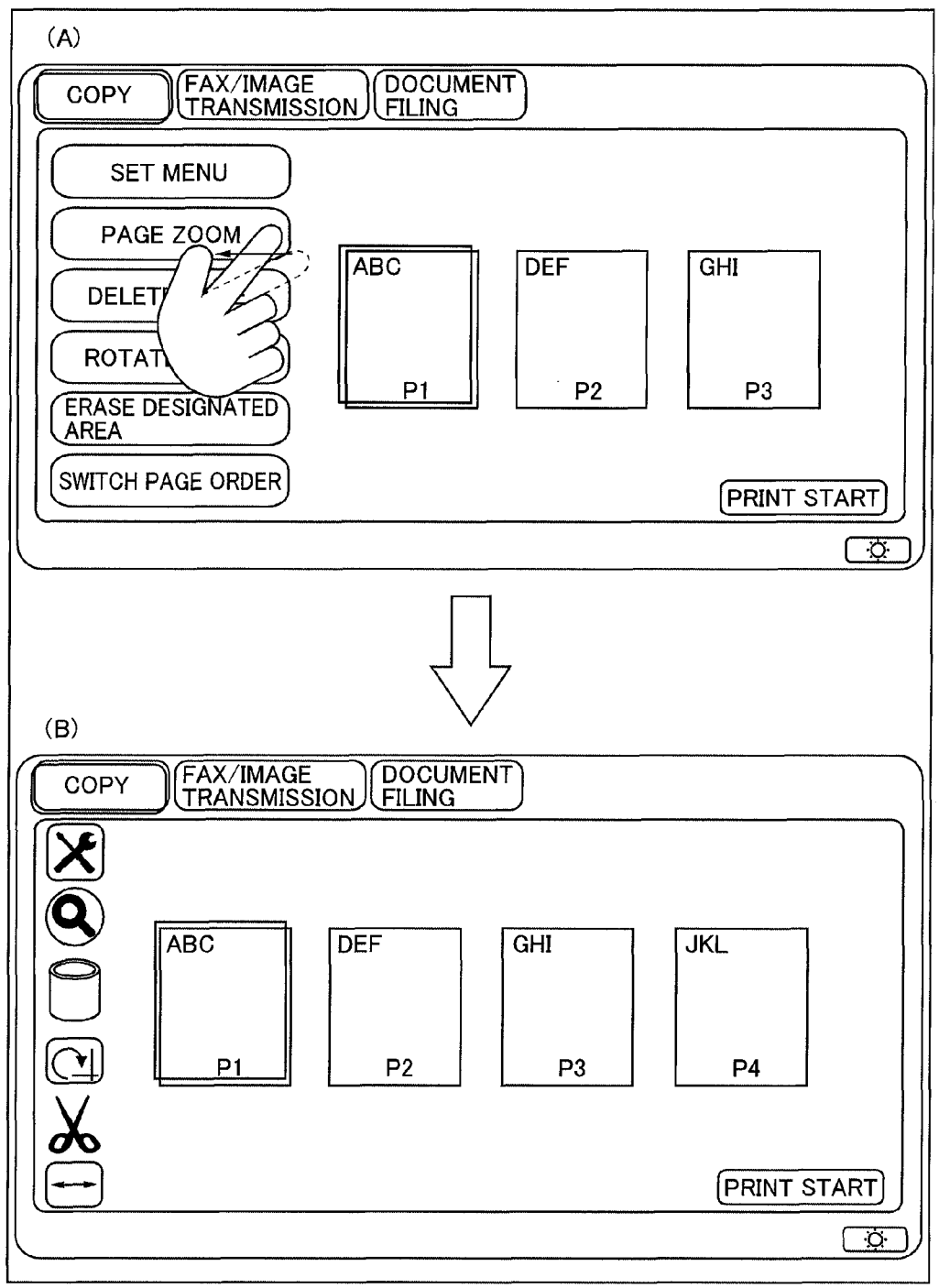
FIG. 18 is a (fourth) example of an image displayed on the display panel of the image forming apparatus in accordance with the second embodiment of the present invention.
Figure 19:
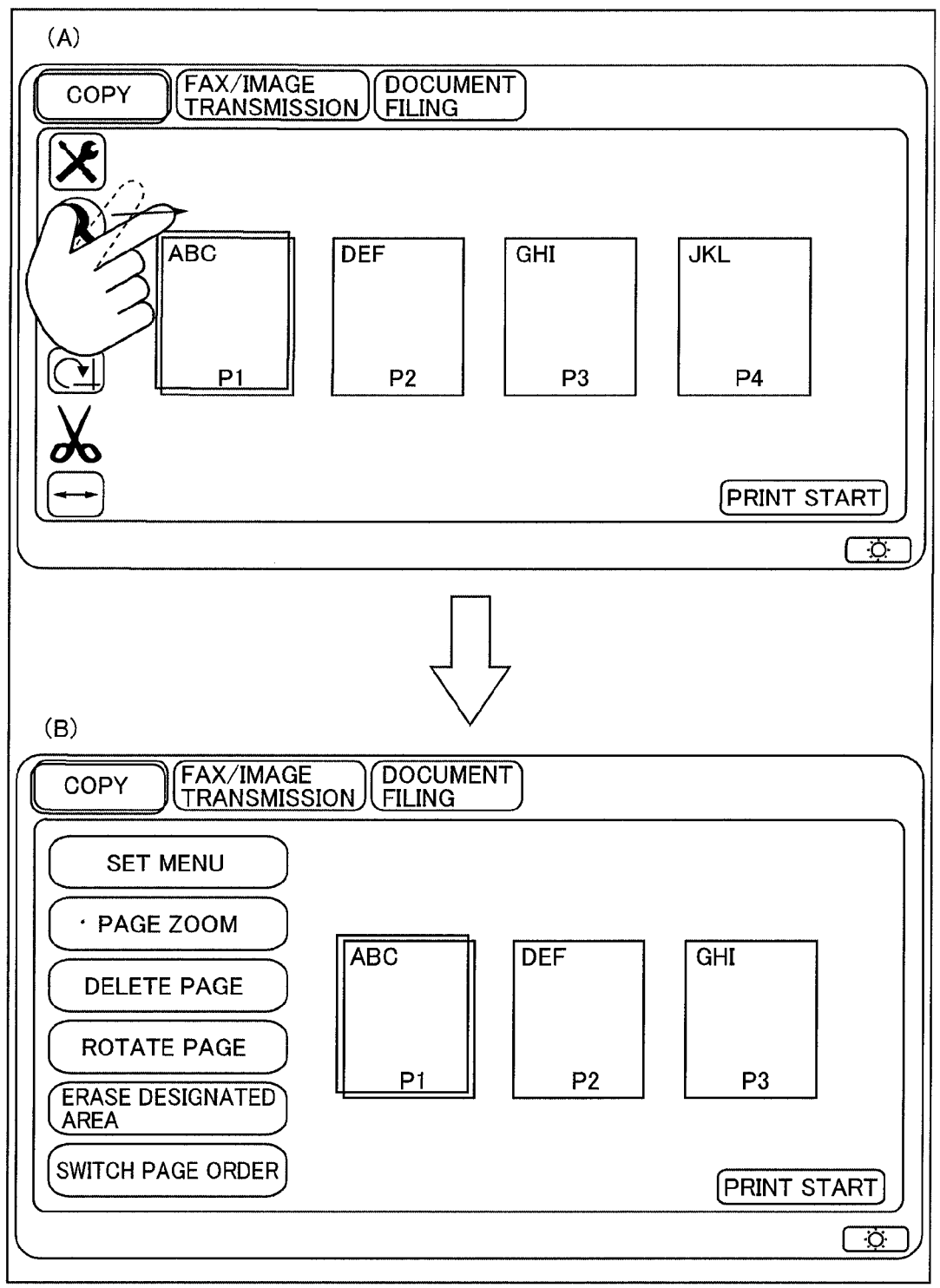
FIG. 19 is a (fifth) example of an image displayed on the display panel of the image forming apparatus in accordance with the second embodiment of the present invention.
Figure 20:
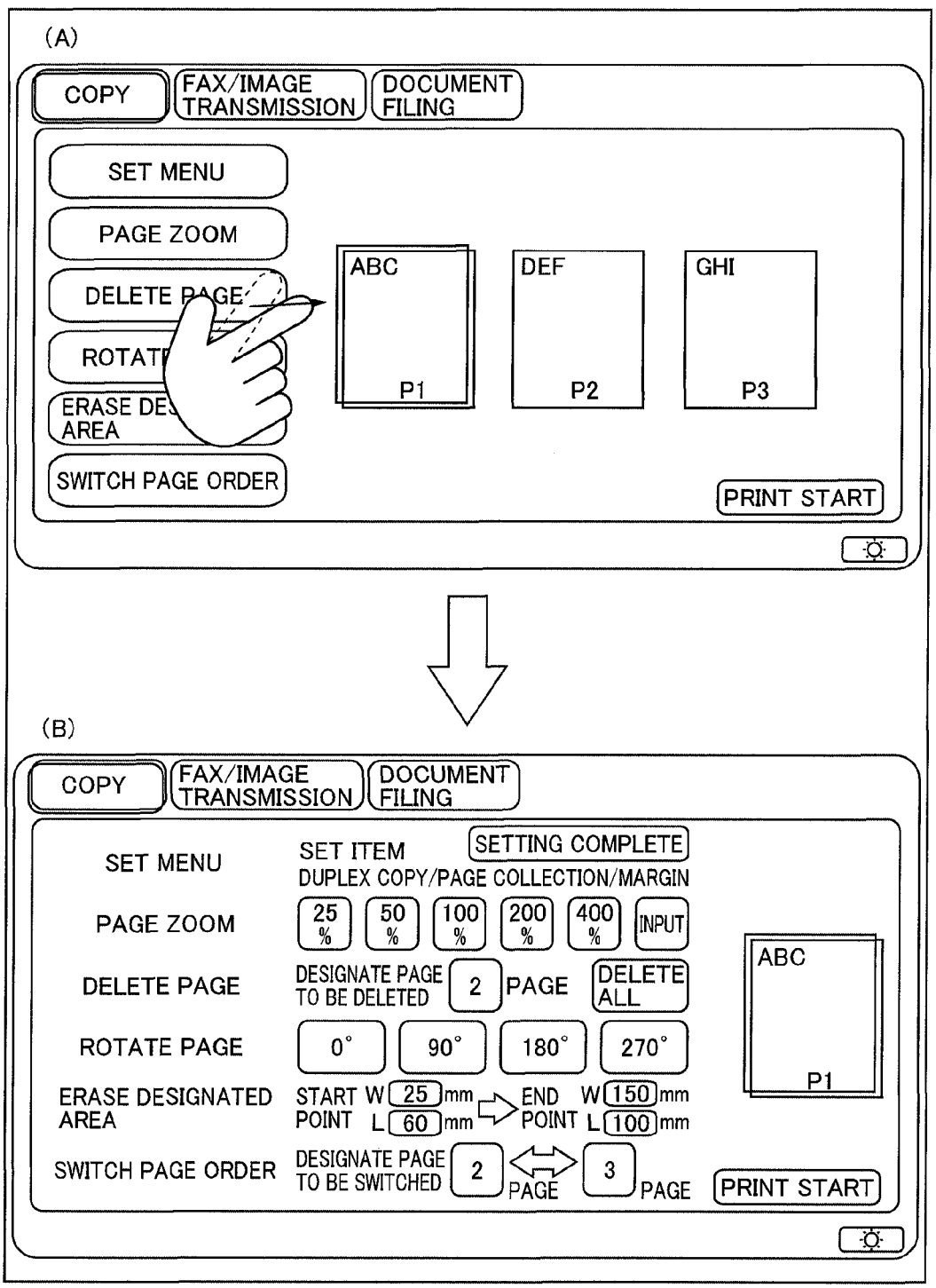
FIG. 20 is a (sixth) example of an image displayed on the display panel of the image forming apparatus in accordance with the second embodiment of the present invention.

Though the description above assumes that the initial display mode is the icon mode, the operation is similar if the initial display mode is the standard mode. FIG. 16 shows an exemplary display on touch-panel display 172 in that case, which corresponds to FIG. 15. Here, since the print setting screen image has been displayed in the standard mode, when the text button of "setting menu" is touched, it is determined to be a request for changing the print setting using the menu (YES at step S2000).

Operation of Changing Display Mode (From Menu Mode to Standard Mode and Icon Mode)

As shown in FIG. 17(A), on touch-panel display 172 on which the setting menu screen image is displayed in the menu mode, if the user flicks the setting menu screen image displayed on touch-panel display 172 to an end portion of touch-panel display 172 (YES at step S1010), the input trajectory is analyzed (step S1020). Here, the gesture operation by the user is determined to be a request for changing the display mode from the menu mode to the standard mode. Since the gesture is a request for changing the display mode (YES at step S1030), the display mode of print setting screen image is changed in accordance with the gesture (step S1040), and the print setting screen image is displayed on touch-panel display 172 in the standard mode as the changed display mode (step S1050). At this time, the screen image shown in FIG. 17(B) is displayed on touch-panel display 172.

With the transition of screen image from FIG. 17(A) to 17(B), the display mode of the print setting screen image in the copy mode is changed from the menu mode to the standard mode, and the setting menu screen image is changed to the text buttons for selecting functions. Thus, the area for displaying the preview image becomes wider (assuming that the page of same size is previewed).

In this manner, as to the setting of display mode, the display of setting menu screen image can be changed to the display of text buttons for selecting functions by a gesture operation that intuitively corresponds to the image transition, and the preview image can be displayed in a large area (or larger number of pages can be displayed).

Further, as shown in FIG. 18(A), on touch-panel display 172 on which the setting menu screen image is displayed in the standard mode, if the user flicks a text button displayed on touch-panel display 172 to an end portion of touch-panel display 172 (YES at step S1010), the input trajectory is analyzed (step S1020). Here, the gesture operation by the user is determined to be a request for changing the display mode from the standard mode to the icon mode. Since the gesture is a request for changing the display mode (YES at step S1030), in accordance with the gesture, the display mode of the print setting screen image is changed (step S1040), and the print setting screen image is displayed in the icon mode as the changed displayed mode, on touch-panel display 172 (step S1050). At this time, the screen image shown in FIG. 18(B) is displayed on touch-panel display 172.

Figure 9:
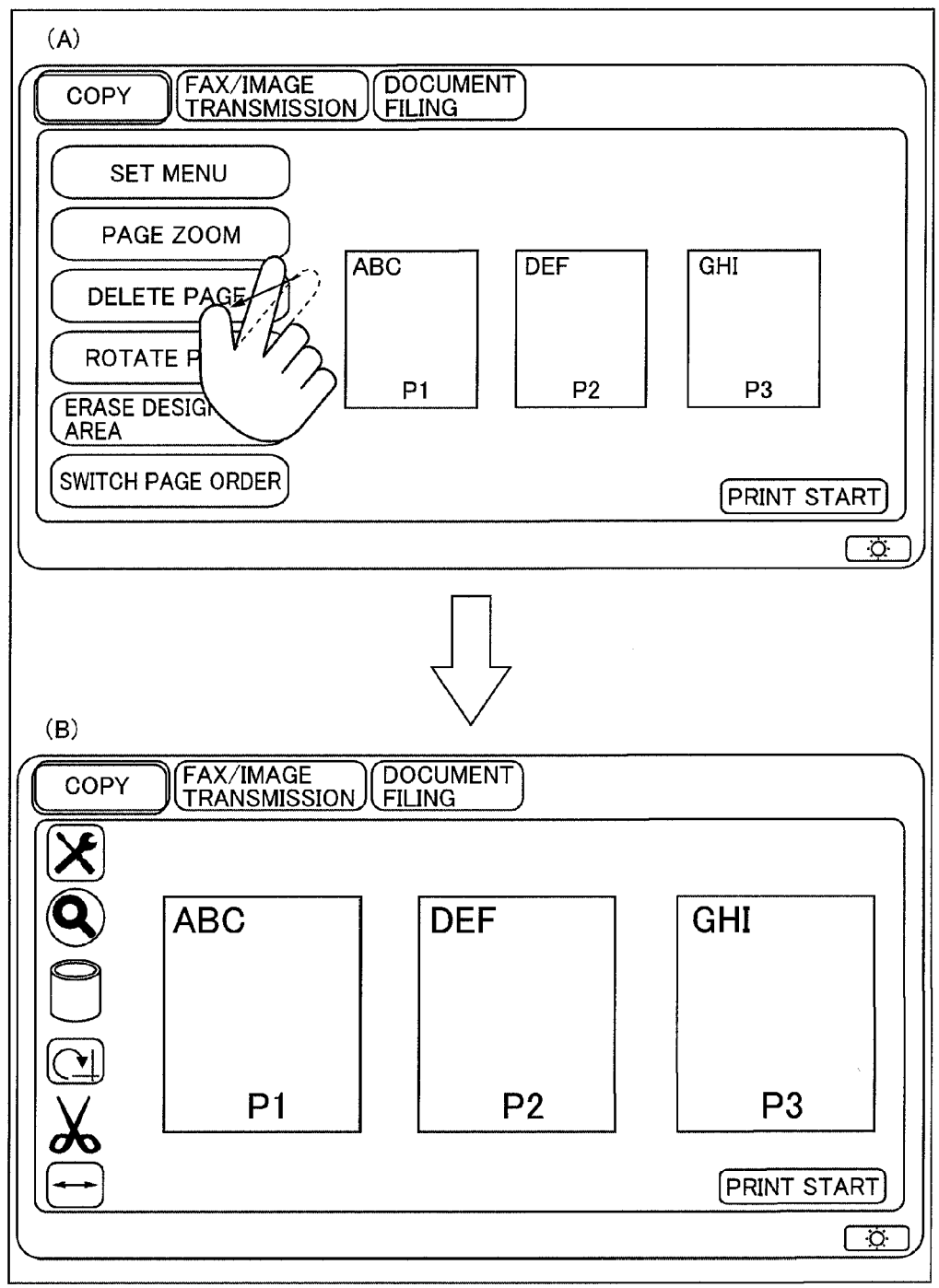
FIG. 9 is a (fifth) example of an image displayed on the display panel of the image forming apparatus in accordance with the first embodiment of the present invention.

With the transition of screen image from FIG. 18(A) to 18(B), the display mode of the print setting screen image in the copy mode is changed from the standard mode to the icon mode, the text buttons for selecting functions are changed to icon buttons, and the area displaying the preview image becomes wider (here, different from the example of FIG. 9, it is assumed that larger number of pages of the same size are previewed).

In this manner, as to the setting of display mode, the display can be changed from the display of text buttons for selecting functions to the display of icon buttons by a gesture operation that intuitively corresponds to the image transition, and the preview image can be displayed in a large area (or larger number of pages can be displayed).

Operation of Changing Display Mode (From Icon Mode to Standard Mode and to Menu Mode)

As shown in FIG. 19(A), on touch-panel display 172 on which the setting menu screen image is displayed in the icon mode, if the user flicks an icon button displayed on touch-panel display 172 to a central portion of touch-panel display 172 (YES at step S1010), the input trajectory is analyzed (step S1020). Here, the gesture operation by the user is determined to be a request for changing the display mode from the icon mode to the standard mode. Since the gesture is a request for changing the display mode (YES at step S1030), in accordance with the gesture, the display mode of the print setting screen image is changed (step S1040), and the print setting screen image is displayed in the standard mode as the changed displayed mode, on touch-panel display 172 (step S1050). At this time, the screen image shown in FIG. 19(B) is displayed on touch-panel display 172.

With the transition of screen image from FIG. 19(A) to 19(B), the display mode of the print setting screen image in the copy mode is changed from the icon mode to the standard mode, the icon buttons for selecting functions are changed to text buttons, the area for displaying the preview image becomes narrower, and the preview display of four pages is changed to the preview display of three pages (assuming that the pages of the same size are to be displayed as previews).

In this manner, as to the setting of display mode, the display can be changed from icon buttons for selecting functions to text buttons, by a gesture operation that intuitively corresponds to the image transition.

Further, as shown in FIG. 20(A), on touch-panel display 172 on which the setting menu screen image is displayed in the standard mode, if the user flicks a text button displayed on touch-panel display 172 to a central portion of touch-panel display 172 (YES at step S1010), the input trajectory is analyzed (step S1020). Here, the gesture operation by the user is determined to be a request for changing the display mode from the standard mode to the menu mode. Since the gesture is a request for changing the display mode (YES at step S1030), in accordance with the gesture, the display mode of the print setting screen image is changed (step S1040), and the setting menu screen image is displayed in the menu mode as the changed displayed mode, on touch-panel display 172 (step S1050). At this time, the screen image shown in FIG. 20(B) is displayed on touch-panel display 172.

With the transition of screen image from FIG. 20(A) to 20(B), the display mode of the print setting screen image in the copy mode is changed from the standard mode to the menu mode, the text buttons for selecting functions are changed to setting menu screen image, the area for displaying the preview image becomes narrower, and the preview display of three pages is changed to the preview display of one page (assuming that the pages of the same size are to be displayed as previews).

In this manner, as to the setting of display mode, the display of text buttons for selecting functions can be changed to the display setting menu screen image, by a gesture operation that intuitively corresponds to the image transition.

As described above, in the image forming apparatus in accordance with the present embodiment, based on a user operation, the display mode of touch-panel display can easily be changed to facilitate the user's work of inputting print settings as the next operation. Further, the display mode can be changed by the gesture operation by the user corresponding to the concept of screen image transition.

Here, it may be possible to set in advance whether priority is given to a large display of one page or display of larger number of pages with the page size unchanged, if the preview display area is changed significantly. Further, it is possible to switch to which the priority is given, in accordance with the gesture operation as in the third embodiment described later, and to give preview display accordingly.

In the absence of any gesture operation for changing the display mode to the menu mode (flick of a text button) by the user, if there is no operation using the menu mode for a predetermined time period, transition to the standard mode (or to the icon mode) may be made. If it is determined that the frequency of the user changing the print setting using the menu mode (not the number as described above but frequency) is high, the menu mode may be stored in hard disk 302 as the custom-setting. Further, it is preferred to have the absence of any operation using the menu mode in the predetermined time period, or the frequency of menu operation, managed user by user and to store the custom-setting accordingly. These approaches are intended to reflect the operation preference of users and to store custom-setting, thereby to improve convenience for the user.

Further, it is also possible to make a transition from the icon mode directly to the menu mode skipping the standard mode, if the user widely flicks an icon button displayed on touch-panel display 172 to the central portion of touch-panel display 172, in the icon mode. In an opposite manner, it is also possible to make a transition from the menu mode directly to the icon mode skipping the standard mode, if the user widely flicks the setting menu screen image displayed on touch-panel display 172 to an end portion of touch-panel display 172, in the menu mode. Further, in place of a wide flick, a software button for making a transition from the icon mode to the menu mode, or a software button for making a transition from the menu mode to the icon mode may be provided.

<Third Embodiment>

In the following, an electronic device in accordance with a third embodiment of the present invention will be described. As in the first and second embodiments, the electronic device in accordance with the present embodiment is an image forming apparatus as one type of image processing apparatuses. As in the first and second embodiments, the operation console in accordance with the present invention is applicable to an image processing apparatus or an electronic device other than such an image forming apparatus.

The electronic device in accordance with the present embodiment includes, as the display mode, the standard mode and the icon mode described above. In the electronic device, dependent on whether the request for changing the print setting based on the gesture operation by the user is a request for image edition of a single page or a request for page edition of a plurality of pages, the manner of preview display is changed. Here, if the display mode is changed from the standard mode to the icon mode and the preview display area become larger and the request for image edition is made, the preview is given in a "details-first" mode in which the number of pages is reduced and one page is displayed in a larger size, and if the request for page edition is made, the preview is given in a "number-first" mode in which larger number of pages is displayed with the size of each page made smaller.

The electronic device in accordance with the present embodiment may be any device that includes an operation console provided with a plurality of commands related to print setting (image edition and page edition), allowing easy customization to have a preview screen image matching the request of changing the print setting required by the user without necessitating any special setting by the user. The preview matching the request for changing the print setting refers to a preview that facilitates confirmation of the change made to the print setting.

The image forming apparatus (FIGS. 1 to 3) is the same as that of the first embodiment described above. Therefore, detailed description thereof will not be repeated here.

In image forming apparatus 150 in accordance with the present embodiment, the control structure of a program executed by CPU 300 differs from that of the first and second embodiments. Except for this point, the present embodiment is the same as the first or second embodiment. The structure and functions are the same as those of the first or second embodiment and, therefore, detailed description thereof will not be repeated here.

[Software Configuration]

Figure 21:
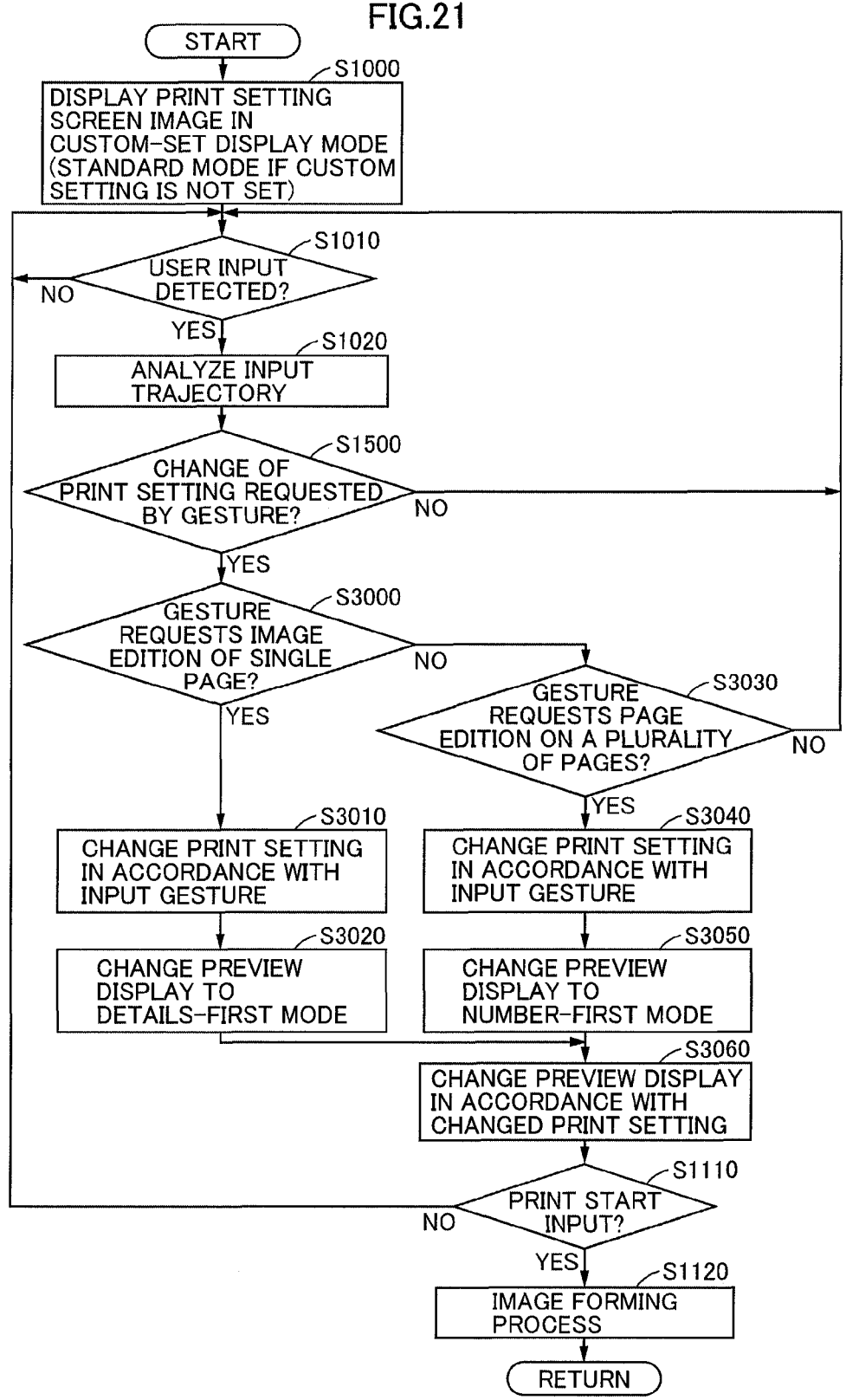
FIG. 21 is a flowchart representing a control structure of a program executed by the image forming apparatus in accordance with a third embodiment of the present invention.

FIG. 21 is a flowchart representing a control structure of a program executed by image forming apparatus 150 in accordance with the present embodiment. The flowchart of FIG. 21 corresponds to the flowchart shown in FIG. 10 of the modification of the first embodiment. In the flowchart shown in FIG. 21, the same process steps as those of the flowchart of FIG. 10 are denoted by the same step numbers. Since the processes of these steps are the same, description thereof will not be repeated here.

As in the first and second embodiments described above, CPU 300 of image forming apparatus 150 executes, in parallel with such a program, a program for realizing general functions of an image forming apparatus. The program, however, is not directly related to the characteristic portion of the present invention and, therefore, details thereof will not be described here.

Referring to FIG. 21, at step S3000, CPU 300 determines whether or not a gesture by the user is a request for image edition on a single page. Here, CPU 300 makes the determination based on the result of analysis of the input trajectory at step S1020. At step S1020, if the trajectory of input by the user corresponds to page zoom (pinch-in/pinch-out), page rotation (finger tip is rotated) or erasure of designated area (area is designated by the finger tip), the gesture is determined to be a request for image edition on a single page. If the trajectory corresponds to page deletion (dragged to a trash box icon) or page order switching (dragged to a destination of movement), the gesture is determined to be a request for page edition on a plurality of pages. If the gesture by the user is determined to be a request for image edition on a single page (YES ate step S3000), the process proceeds to step S3010. Otherwise (NO at step S3000), the process proceeds to step S3030.

At step S3010, CPU 300 changes print setting in accordance with the input gesture (here, the gesture represents a request for image edition on a single page).

At step S3020, CPU 300 changes the preview display to the details-first mode, in which one page is displayed in a large size while reducing the number of pages displayed, if necessary. Then, the process proceeds to step S3060.

At step S3030, CPU 300 determines whether or not the gesture by the user is a request for page edition on a plurality of pages. If the gesture by the user is determined to be a request for page edition on a plurality of pages (YES at step S3030), the process proceeds to step S3040. Otherwise (NO at step S3030), the process returns to step S1010.

At step S3040, CPU 300 changes the print setting in accordance with the input gesture (here, a gesture represents a request for page edition on a plurality of pages).

At step S3050, CPU 300 changes the preview display to the number-first mode in which a larger number of pages is displayed, while the size of each page is made smaller. Thereafter, the process proceeds to step S3060.

At step S3060, CPU 300 displays the preview changed in accordance with the changed print setting, on touch-panel display 172. Thereafter, the process proceeds to step S1110.

[Operation]

Figure 22:
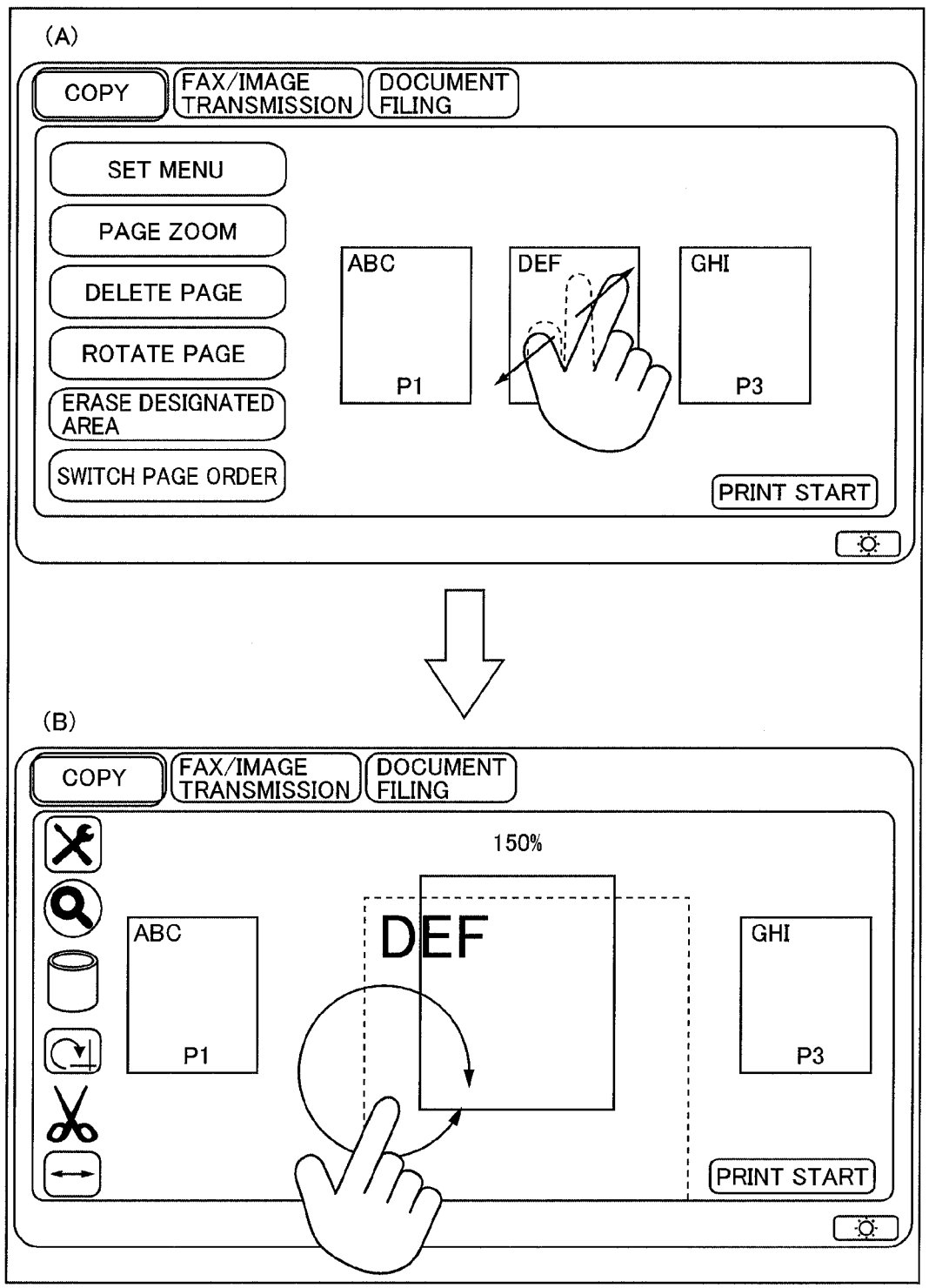
FIG. 22 is a (first) example of an image displayed on the display panel of the image forming apparatus in accordance with the third embodiment of the present invention.
Figure 23:
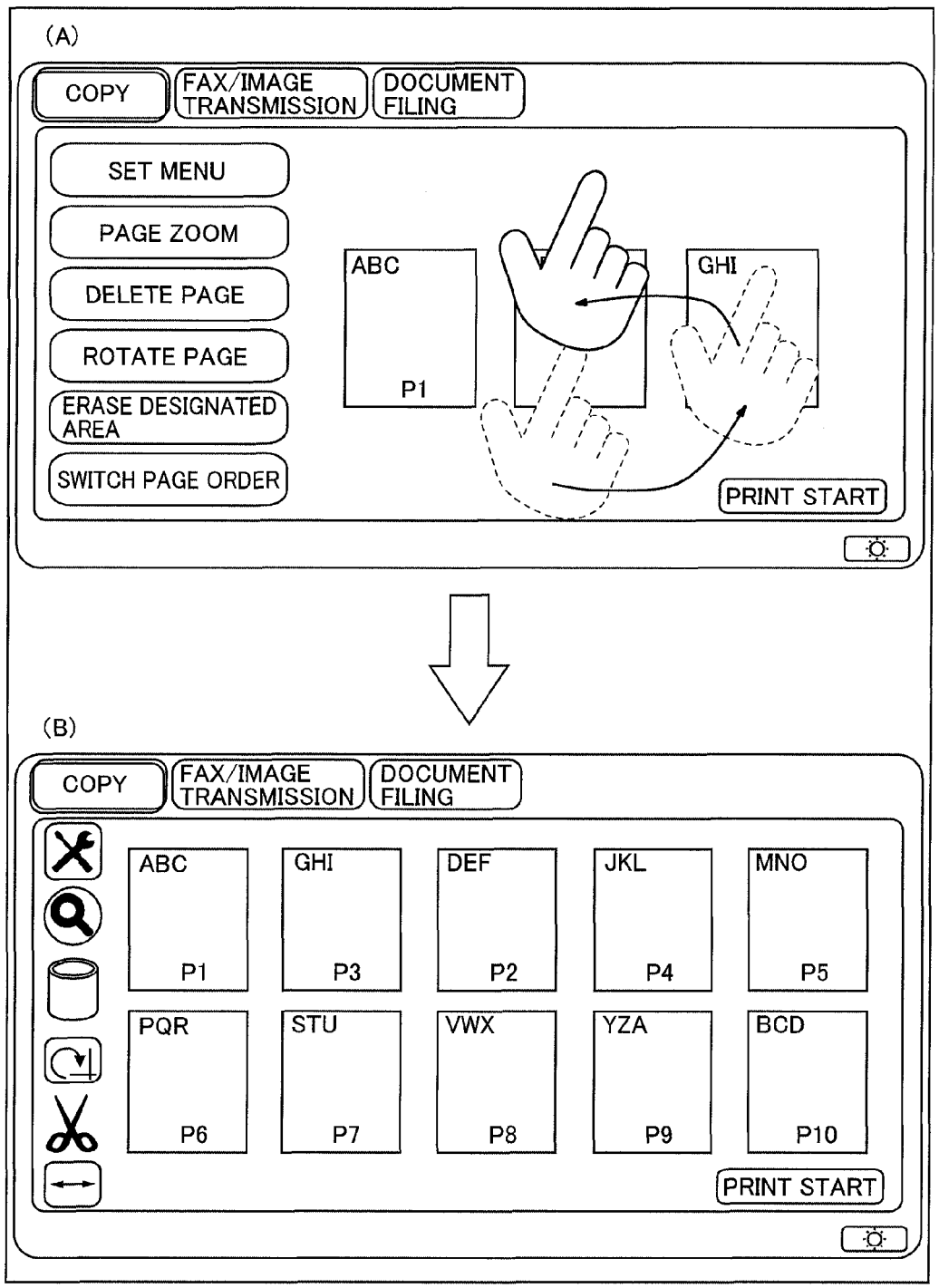
FIG. 23 is a (second) example of an image displayed on the display panel of the image forming apparatus in accordance with the third embodiment of the present invention.

The operation of image forming apparatus 150 in accordance with the present embodiment based on the configuration and flowchart as above will be described with reference to FIGS. 22 and 23 showing examples of display on touch-panel display 172.

Operation of Changing Print Setting Using Gesture Operation (Page Enlargement)

In the description of the operation, it is assumed that the display mode is the standard mode, and the print setting screen image is displayed on touch-panel display 172.

Assume that the print setting screen image is displayed in this manner on touch-panel display 172. In this state, if a user pinches out (pinches open) the position where the central page of three previewed pages is displayed as shown in FIG. 22(A) (YES at step S1010), the input trajectory is analyzed (step S1020). Here, the gesture operation by the user is analyzed to be a request for changing the print setting of the page to enlarged copy. Since the gesture is a request for changing the print setting (YES at step S1500), whether or not the request is for image edition on a single page is determined (step S3000). At this time, the user made a gesture operation of pinch-out (pinch-open) on the preview image as shown in FIG. 22(A) and, therefore, the request of changing print setting by the gesture is determined to be a request of image edition on a single page (YES at step S3000).

In accordance with the input gesture operation, the print setting for the central page is changed to enlarged copy (step S3010), and the preview display is changed to the details-first mode (step S3020). In the details-first mode, the preview changed in accordance with the changed print setting is displayed (step S3060). Here, on touch-panel display 172, the screen image shown in FIG. 22(B) is displayed.

With the transition of screen image from FIG. 22(A) to 22(B), the text buttons for selecting functions in the print setting screen image in the copy mode are changed to icon buttons, and the area displaying the preview image becomes wider. It can be seen from the comparison between FIGS. 22(A) and 22(B) that the left page and the right page are previewed with the size of recording paper and the size of characters on the document unchanged, and that the central page is previewed with the same paper size but with enlarged size of document characters in FIG. 22(B). In this manner, since the print setting of the central page is changed to enlarged copy, the document area (represented by dotted lines) is larger than the frame (represented by solid lines) of recording paper as shown in FIG. 22(B). Here, the magnification ratio of enlarged copy may be set, for example, by the width of user's pinch-out (pinch-open) operation. It is preferred to indicate the magnification ratio (here, "150%") as shown in FIG. 22(B). Further, as shown in FIG. 22(B), it is preferred that the position of enlarged document with respect to the sheet of recording paper may be changed by dragging the enlarged document with a finger tip. This dragging may set which part of the enlarged document is to be printed.

In this manner, when a command intended for a change of a single page is designated by a gesture operation, the display mode is changed from the standard mode to the icon mode and whereby the preview area is enlarged, and on the preview area thus enlarged, the single page of which print setting is to be changed is displayed in a large size, with the number of pages reduced.

As described above, by the gesture operation of the user, the print setting is changed, the display mode is changed and the preview image is displayed in an enlarged size, with one page displayed in a large size corresponding to the designated command. Therefore, the user can easily confirm the print setting using the preview image.

Operation of Changing Print Setting Using Gesture Operation (Switching of Page Order)

In the description of the operation also, it is assumed that the display mode is the standard mode, and the print setting screen image is displayed on touch-panel display 172.

On touch-panel display 172 displaying the print setting screen image in this manner, if the user drags to the right a position of a central page among three previewed pages and thereafter drags to the left a position where the right side page among the three pages is previewed as shown in FIG. 23(A) (YES at step S1010), the input trajectory is analyzed (step S1020). Here, the gesture operation by the user is analyzed to be a request for switching the second and third pages. The gesture is a request for changing print setting (YES at step S1500), and the request is not a request for image edition on a single page (NO at step S3000). Therefore, whether or not the request is for page edition on a plurality of pages is determined (step S3030). Here, since the user made a gesture operation of dragging the second and third pages to switch the order on the preview image as shown in FIG. 23(A), the request for changing print setting by the gesture is determined to be a request for page edition on a plurality of pages (YES at step S3030). If the user drags the position of the central page (second page) among the three previewed pages to the right side of the right page (third page) of the three pages (and whereby the third page automatically moves to the left side), such a gesture operation by the user may also be analyzed to be a request for switching the second and third pages.

In accordance with the input gesture operation, the print setting is changed to the copy in which the second and third pages are switched (step S3040), and the preview display is changed to the number-first mode (step S3050). In the number-first mode, the preview changed in accordance with the changed print setting is displayed (step S3060). At this time, a screen image shown in FIG. 23(B) is displayed on touch-panel display 172.

With the transition of screen image from FIG. 23(A) to 23(B), the text buttons for selecting functions in the print setting screen image in the copy mode are changed to icon buttons, and the area displaying the preview image becomes wider. It can be seen from the comparison between FIGS. 23(A) and 23(B) that in FIG. 23(A), the preview display contains only three pages while in FIG. 23(B), the preview display contains ten pages.

In this manner, if a command intended for a change involving a plurality of pages is designated by a gesture operation, the display mode is changed from the standard mode to the icon mode and whereby the preview area is enlarged, and on the preview area thus enlarged, the preview image is displayed with the number of pages increased and the size of each page reduced.

As described above, by the gesture operation of the user, the print setting is changed, the display mode is changed and the preview image is displayed in an enlarged size, with a larger number of pages displayed corresponding to the designated command. Therefore, the user can easily confirm the print setting using the preview image.

As can be seen from the foregoing, in the image forming apparatus according to the present embodiment, the mode of preview display is automatically changed so that a preview allowing easy confirmation of the print setting designated by the user can be displayed. Therefore, it is possible for the user to view the preview image allowing easy confirmation of print setting, without making any operation of switching the mode of preview display.

In the present embodiment, as in the embodiments described above, the print setting may be changed by touching an icon button or a text button.

Further, in the first and third embodiments, the menu mode described with reference to the second embodiment may be added, and the three display modes may be switched.

In the second and third embodiments, the manner of requesting a change in print setting, rather than the change in preview display, by a touch operation or gesture operation has been described. As in the first embodiment (not the modification), a change in preview display may be requested by a touch operation or gesture operation, in the second and third embodiments as well.

The embodiments as have been described here are were examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation console provided on an apparatus as an object of control, comprising:
   a touch-panel display;
   a display control unit controlling said touch-panel display so that information to be notified to a user is displayed; and an input control unit, controlling said touch-panel display such that in response to a user touching said touch-panel display, either a request to said apparatus as the object of control or a request for changing manner of display on said touch-panel display is detected; wherein said input control unit includes a first detecting unit detecting said request based on a position where the user touched the touch-panel display, and a second detecting unit detecting said request based on a trajectory of where the user touched the touch-panel display; and said display control unit is capable of displaying an icon displayed on said touch-panel display in a first manner of display and in a second manner of display larger than said first manner of display, said display control unit includes a changing unit for changing, if a request for changing a display mode by a flick operation following a touch to a position of said icon by the user is detected by said second detecting unit, the manner of display of said icon detected by said first detecting unit to said first manner of display or said second manner of display, in accordance with a direction of said flick operation, and said second detecting unit detects a request for changing the display mode between a first display mode in which a request is detected based on a touched position and a second display mode in which a request is detected based on a touched trajectory.

2. The operation console according to claim 1, wherein said changing unit includes a priority unit changing the manner of display of said icon displayed on said touch-panel display such that priority is given to said second manner of display.

3. The operation console according to claim 1, wherein a preview display area for displaying, as a preview, expected result when a process is executed is provided on an area on said touch-panel display other than where said icon is displayed; and said display control unit further includes a preview area changing unit changing size of said preview display area in accordance with the change in manner of display of said icon.

4. The operation console according to claim 3, wherein said display control unit further includes an increasing unit for increasing the number of said previews to be displayed, if said preview display area is enlarged by said preview area changing unit.

5. The operation console according to claim 1, wherein said changing unit includes a manner changing unit changing manner of display to said first manner of display or to said second manner of display based on history of detection of a user's request by said first detecting unit and history of detection of a user's request by said second detecting unit.

6. The operation console according to claim 5, wherein said history reflects operation preference of the user.

7. The operation console according to claim 1, further comprising a storage unit storing setting of manner of display of information items displayed on said touch-panel display based on history of detection of a user's request by said first detecting unit and history of detection of a user's request by said second detecting unit.

8. The operation console according to claim 7, wherein said history reflects operation preference of the user.

9. An electronic device provided with the operation console according to claim 1.

10. An image processing apparatus provided with the operation console according to claim 1.

11. A method of operating an operation console provided on an apparatus as an object of control, wherein said operation console includes a touch-panel display and an operation unit;

said method comprising:

display control step of controlling said touch-panel display such that information to be notified to a user is displayed, using said operation unit; and input control step of controlling said touch-panel display such that in response to a user touching said touch-panel display, either a request to said apparatus as the object of control or a request for changing manner of display on said touch-panel display is detected, using said operation unit; wherein said input control step includes a first detecting step of detecting said request based on a position where the user touched the touch-panel display, and a second detecting step of detecting said request based on a trajectory of where the user touched the touch-panel display; and said display control step includes a changing step of changing, if a user's request for changing a display mode by a flick operation following a touch to a position of said icon by the user is detected at said second detecting step, the manner of display of said icon detected at said first detecting step to a first manner of display or to a second manner of display larger than said first manner of display, and at said second detecting step, a request for changing the display mode between a first display mode in which a request is detected based on a touched position and a second display mode in which a request is detected based on a touched trajectory is detected.

* * * * *